United States Patent
Shimizu et al.

(10) Patent No.: US 7,570,638 B2
(45) Date of Patent: Aug. 4, 2009

(54) INTER-DOMAIN ROUTING TECHNIQUE USING MPLS

(75) Inventors: Takao Shimizu, Kawasaki (JP);
Naoyuki Takahashi, Kawasaki (JP);
Norikazu Matsukawa, Kawasaki (JP);
Kazuhiro Iitsuka, Kawasaki (JP);
Michio Kitade, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 11/287,338

(22) Filed: Nov. 28, 2005

(65) Prior Publication Data

US 2006/0262786 A1    Nov. 23, 2006

(30) Foreign Application Priority Data

May 18, 2005    (JP) .............................. 2005-145814

(51) Int. Cl.
*H04L 12/00* (2006.01)

(52) U.S. Cl. ................... 370/389; 370/351; 370/430; 370/395.51; 719/311

(58) Field of Classification Search ............... 370/349, 370/447, 235, 351, 395.2; 709/238, 223; 455/12.1
See application file for complete search history.

(56) References Cited

U.S. PATENT DOCUMENTS

| | | | |
|---|---|---|---|
| 6,683,385 B2 * | 1/2004 | Tsai et al. ................... | 257/777 |
| 6,683,865 B1 * | 1/2004 | Garcia-Luna-Aceves et al. | 370/349 |
| 7,082,102 B1 * | 7/2006 | Wright ........................ | 370/229 |
| 7,190,698 B2 * | 3/2007 | Svanberg et al. ......... | 370/395.2 |
| 2002/0051449 A1 | 5/2002 | Iwata | |
| 2004/0058646 A1 * | 3/2004 | Courtney et al. ........... | 455/12.1 |
| 2005/0262232 A1 * | 11/2005 | Cuervo et al. ............... | 709/223 |
| 2006/0274718 A1 * | 12/2006 | Butenweg et al. .......... | 370/351 |

FOREIGN PATENT DOCUMENTS

WO    WO2004098109 A2 *    11/2004

* cited by examiner

*Primary Examiner*—Dang T Ton
*Assistant Examiner*—Mohamed Kamara
(74) *Attorney, Agent, or Firm*—Fujitsu Patent Center

(57) ABSTRACT

This invention is to enable inter-domain routing using MPLS. When communication is carried out passing through plural domains, respective management servers managing respective domains cooperate to carry out path constitution and optimum routing. At the path constitution, the respective management servers connect links within the respective controlling domain to constitute paths to reach a target address. When the paths are constituted, label data is notified to nodes associated with the constituted paths, and is used at the routing. At the routing, the management server controlling the source domain obtains the dynamic transmission bandwidths from the respective management servers, and identifies the routing policy from a port number of a request to be routed or the like to identify the optimum path. When the optimum path is determined, it is possible to carry out the routing using the label data held in the respective nodes.

17 Claims, 19 Drawing Sheets

| LABEL | VIRTUAL LABEL | LABEL |
|---|---|---|
| L11 | L11r | Lm |
| L12 | L12r | |

FIG.5

| LINK | LABEL |
|---|---|
| $\ell$ 121 | L11 |
| $\ell$ 123 | L12 |
| $\ell$ 124 | Lm |
| ⋮ | ⋮ |
| | |

FIG.6

| LINK(Lid) | LABEL(La) | | |
|---|---|---|---|
| $\ell$ 1015 | A | B | C |
| ⋮ | ⋮ | ⋮ | ⋮ |
| $\ell$ 5001 | X | Y | Z |

FIG.7

| LINK (Lid) | Bs | RTid | Pri-$\rho$ | |
|---|---|---|---|---|
| | | | 0 | 1 |
| $\ell$ 1015 | 100 | RT10 | 20% | 15% |
| | | RT15 | 30% | 20% |
| ⋮ | ⋮ | ⋮ | ⋮ | ⋮ |
| $\ell$ 1015 | 100 | RT10 | 30% | 20% |
| | | RT15 | 20% | 15% |

FIG.8

| SNo | SNd | LP# | FAILURE | | Lr | Bs | Bs BN | Cal | Pri | BdU | BdU BN | BdD | BdD BN | LABEL DATA | | | | | | |
|---|---|---|---|---|---|---|---|---|---|---|---|---|---|---|---|---|---|---|---|---|
| | | | U | D | | | | | | | | | | La | ρU | ρD | | La | ρU | ρD |
| 10 | 20 | 1 | — | — | 10.1 | 100 | (La) | M/D | 0 | 60 | (La) | 40 | (La) | A | 20% | 30% | | X | 30% | 20% |
| | | | | | | | | | | | | | | | 15% | 20% | | | 20% | 15% |
| | | 2 | — | — | 10.2 | 80 | (La) | M/D | 1 | 70 | (La) | 60 | (La) | B | 20% | 25% | ... | Y | 25% | 20% |
| | | | | | | | | | | | | | | | 15% | 20% | | | 20% | 15% |
| | | 3 | — | — | 10.3 | 60 | (La) | M/D | 0 | 30 | (La) | 50 | (La) | C | 20% | 30% | | Z | 30% | 20% |
| | | | | | | | | | 1 | 60 | (La) | 60 | (La) | | 15% | 20% | | | 20% | 15% |
| | | | | | | | | | 0 | 40 | (La) | 30 | (La) | | | | | | | |
| | | | | | | | | | 1 | 50 | (La) | 40 | (La) | | 15% | 25% | | | | |

FIG.9

| SNo | SNd | LP# | Bsa | Bs total | BdUa | BdDa | BdU total | BdD total |
|---|---|---|---|---|---|---|---|---|
| IPo | IPd | | 100 | 50 | 60 | 40 | 30 | 50 |
| | | | 100 | 50 | 70 | 60 | 40 | 30 |
| | | | | | | | | |

...

LABEL DATA

| La | ρU/ρD | La | ρU/ρD | La | ρU/ρD | La | BdU/BdD | La | BdU/BdD |
|---|---|---|---|---|---|---|---|---|---|
| LPa1 | 20/30 | LPa1' | 20/30 | LPa1'' | 20/30 | ASb.LPb1 | 20/30 | DOMAIN C | 20/30 |
| LPa2 | 20/30 | LPa2' | 20/30 | LPa2'' | 20/30 | ASb.LPb2 | 20/30 | DOMAIN C | 20/30 |
| | | | | ... | ... | | | | |

FIG.16

| LABEL | VIRTUAL LABEL | | LABEL |
|---|---|---|---|
| LPc1" | LPc1 | ASa.LPa1 | IPd |
| LPc2" | LPc2 | ASa.LPa2 | IPd |

FIG.17

| LABEL | VIRTUAL LABEL | | LABEL |
|---|---|---|---|
| ASc.LPc1 | LPc1 | ASa.LPa1 | LPc1' |
| ASc.LPc2 | LPc2 | ASa.LPa2 | LPc2' |

FIG.18

| LABEL | VIRTUAL LABEL | | LABEL |
|---|---|---|---|
| LPb1" | LPb1 | ASa.LPa1 | ASc.LPc1 |
| LPb2" | LPb2 | ASa.LPa2 | ASc.LPc2 |

FIG.19

| LABEL | VIRTUAL LABEL | | LABEL |
|---|---|---|---|
| ASb.LPb1 | LPb1 | ASa.LPa1 | LPb1' |
| ASb.LPb2 | LPb2 | ASa.LPa2 | LPb2' |

FIG.20

| LABEL | VIRTUAL LABEL | | LABEL |
|---|---|---|---|
| LPa1" | LPa1 | | ASb.LPb1 |
| LPa2" | LPa2 | | ASb.LPb2 |

FIG.21

| LABEL | VIRTUAL LABEL | | LABEL |
|---|---|---|---|
| IPo | | | LPa1 |
| IPo | | | LPa2 |

FIG.22

| LP | DIRECTION | STATIC TRANSMISSION BANDWIDTH | TOTAL DYNAMIC TRANSMISSION BANDWIDTH | DYNAMIC TRANSMISSION BANDWIDTH IN DOMAIN A | DYNAMIC TRANSMISSION BANDWIDTH IN DOMAIN B | DYNAMIC TRANSMISSION BANDWIDTH IN DOMAIN C |
|---|---|---|---|---|---|---|
| LPa1 | FORWARD | 100 | 50 | 50 | 60 | 80 |
| | BACKWARD | 100 | 40 | 40 | 50 | 70 |
| LPa2 | FORWARD | 80 | 40 | 50 | 40 | 60 |
| | BACKWARD | 80 | 60 | 60 | 70 | 80 |
| LPa3 | FORWARD | 70 | 30 | 30 | 50 | 60 |
| | BACKWARD | 70 | 45 | 45 | 50 | 60 |
| LPa4 | FORWARD | 60 | 30 | 30 | 55 | 60 |
| | BACKWARD | 60 | 40 | 40 | 40 | 60 |

FIG.24

| LP | Bs total | BdU total | BdD total |
|---|---|---|---|
| LPa1 | 100 | 40 | 3 |
| LPa2 | 80 | 30 | 10 |
| LPa3 | 50 | 20 | 30 |

FIG.26A

| LP | Bs total | BdU total | BdD total |
|---|---|---|---|
| LPa1 | 100 | 40 | 3 |
| LPa2 | 80 | 30 | 10 |
| LPa3 | 50 | 20 | 30 |

FIG.26B

| LP | Bs total | BdU total | BdD total |
|---|---|---|---|
| LPa1 | 100 | 40 | 3 |
| LPa2 | 80 | 30 | 10 |
| LPa3 | 50 | 20 | 30 |

FIG.26C

| LP | Bs total | BdU total | BdD total |
|---|---|---|---|
| LPa1 | 100 | 40 | 3 |
| LPa2 | 80 | 30 | 10 |
| LPa3 | 50 | 20 | 30 |

FIG.26D

INTER-DOMAIN ROUTING TECHNIQUE USING MPLS

TECHNICAL FIELD OF THE INVENTION

The present invention relates to a path control technique for a network.

BACKGROUND OF THE INVENTION

A conventional path control technique for a network has following problems: (a) it is impossible to detect routes being congested, in advance; (b) symmetric routing in uplink and downlink cannot be forcibly carried out; (c) it is impossible to reflect the state of a server in routing; (d) it requires a load and/or time to check the states of routes; and (e) it requires a load and/or time to carry out a dynamic processing. Especially, because the Internet, which has come into wide use in recent years, has developed without considering the entire efficiency improvement, it has a lot of problems in efficiency. For example, as for the routing and switching, because autonomous operations are assumed, the protocol is complicated, and there are a lot of case in which the state in the network is not unknown.

In order to solve these problems, the application of MPLS (Multi Protocol Label Switching) has been studied. However, because (a) different routing policies are used for respective domains; (b) an administrator requests not to open the state of a network to other domains; (c) the mutual operation of MPLS may be unstable or the like, MPLS has not been applied to routing between different domains.

Further, US 2002/0051449 discloses a technique for solving the aforementioned problems in the path control for an inter-domain network. More specifically, in the path control for the inter-domain network, by allowing to acquire path information with a network resource in a destination domain in addition to path information with a network resource in an inter-domain and a source domain, it is possible to select a path considering network resources of End-to-End, and to select the optimum path in not only the transmission direction but also the reception direction. Furthermore, by allowing to acquire information on the processing load of a service node in addition to the network resource, it is possible to select the optimum server using such information and the network resource, and to select the optimum path to the optimum destination server. However, this publication does not study MPLS. Moreover, because in this technique, routing is carried out according to a routing protocol, a large amount of load is necessary for routers.

As described above, conventionally, the path control between domains, to which MPLS is applied, has not been studied. Therefore, there are problems in which in communication between domains, to which MPLS is applied, it is impossible to carry out the optimum routing of End-to-End, to avoid network congestion, and to carry out symmetric routing.

SUMMARY OF THE INVENTION

Therefore, an object of the invention is to provide a technique to enable to carry out routing between domains when MPLS is applied.

An information processing method (i.e. an inter-domain path setting method by a management server) according to a first aspect of the invention is an information processing method executed by a management server that manages paths between arbitrary nodes in a specific domain and includes: (a) when a path is constituted between a source address associated with the specific domain and a destination address associated with a second domain different from the specific domain, constituting a plurality of paths between a first node associated with the source address and a second node associated with the second domain in the specific domain, identifying, as registered paths, a predetermined number of paths whose bandwidth is ranked within the top predetermined number among the plurality of paths, and storing the source address, the destination address and data concerning the registered path for each registered path into a path data storage; (b) transmitting, to a management server in a third domain connected to the second node, a constitution request including the source address and the destination address, and including, for each registered path, data concerning bandwidth of the registered path and data concerning the second node; (c) when a constitution information notice including the source address, the destination address, and including, for each registered path, data concerning a connection link between the second node and a connection node on the third domain side is received from the management server in the third domain, storing the data concerning the connection link into the path data storage, in association with a combination of the source address, the destination address, and the registered path; and (d) carrying out setting for routing to nodes associated with the registered path in the specific domain by using the data stored in the path data storage.

As described above, in a case where a path is constituted between the domains, it is impossible to completely constitute the path only in one domain. Therefore, by transmitting the aforementioned constitution request to a management server in the domain associated with the path, and receiving the aforementioned constitution information from the management server in the domain associated with the path, the entire path is constituted, and it becomes possible to connect adjacent domains.

Incidentally, in the first aspect of the invention, a label unique in each domain may be assigned to a head link included in the path, and a link of a portion connected with another domain may be specified by identification information of a domain to which the link belongs and a label in the domain, and the aforementioned data concerning the registered path may include labels of links included in the registered path.

Furthermore, a label unique to a plurality of predetermined domains may be attached to each head link constituting the path, and the aforementioned data concerning the registered path may include the labels of the links constituting the registered path.

In the first aspect of the invention, a label unique to each domain may be attached as a virtual label (which will be described later) of the path. In addition, the link at a portion connected to another domain may be specified by identification information of the domain to which the link belongs and a label in the domain, and data concerning the registered path may include the labels of links constituting the registered path.

Moreover, a label unique to a plurality of predetermined domains may be attached as virtual label (which will be described later) of the path, and the aforementioned data concerning the registered path may include the labels of the links constituting the registered path.

Further, an information processing method (i.e. a method of determining an optimum dynamic path between domains) according to a second aspect of the invention is an information processing method executed by a management server in a source side domain of communication when the communication is carried out through a plurality of domains, and includes: (a) when a path setting request including data concerning a source and a destination of a packet is received from, for example, a source side edge router, referring to a path data storage storing data of a candidate path in association with a source address and a destination address to identify candidate paths relating to the path setting request; (b) identifying a routing policy of the packet on the basis of data concerning the destination of the path setting request; (c) requesting a management server of another associated domain on the identified candidate path to transmit data concerning a dynamic bandwidth of the identified candidate path in the associated domain; (d) when the data concerning the dynamic bandwidth of the identified candidate path in the associated domain is received from the management server of the associated domain on the identified candidate path, calculating total dynamic bandwidth of the entire candidate path on the basis of data concerning the dynamic bandwidth of the identified candidate path in the source domain and the received data concerning the dynamic bandwidth of the identified candidate path in the associated domain, and storing data of the calculated total dynamic bandwidth into a storage; (e) determining an optimum path from the identified candidate paths on the basis of the routing policy and the calculated total dynamic bandwidths of the entire identified candidate paths, which are stored in the storage; and (f) transmitting data to identify the optimum path to a requesting source of the path setting request.

By carrying out the aforementioned processing, when a packet is actually transmitted, a path is determined considering both the data concerning the dynamic bandwidth and the routing policy. Therefore, it becomes possible to carry out routing, more appropriately. In addition, the optimum path may include the designation of uplink or downlink path.

Furthermore, a router (i.e. an inter-domain path control router) according to a third aspect of the invention is a router that carries out routing according to an instruction from a management server for managing paths between arbitrary nodes in a specific domain, and includes a data storage storing a pair of labels assigned to an input link and an output link that are directly connected to this router among links constituting paths passing through this router, and relationships between labels and links; and a routing unit that refers to the data storage to identify a link and an output label corresponding to an input label included in a received packet and carries out routing on the received packet. In addition, the same label is assigned to a shared link shared with a plurality of paths, and when this router is on a path passing through a plurality of domains, and belongs to a domain other than a source domain of the path, the data storage further stores data to identify a branch direction at a reverse routing and data to identify the entire path in association with the pair of labels.

By using such a router in the domains, appropriate routing to which MPLS is applied is carried out even for inter-domain and intra-domain.

It is possible to create a program for causing a computer to execute the information processing method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 5 is a diagram illustrating an example of a label map;

FIG. 6 is a diagram illustrating an example of a link table in a router;

FIG. 7 is a diagram illustrating an example of a link table in an LP management server;

FIG. 8 is a diagram illustrating an example of a link data table;

FIG. 9 is a diagram illustrating an example of an LP table;

FIG. 16 is a diagram illustrating an example of data stored in an LP-DB used for rouging passing through the plural domains;

FIG. 17 is a diagram illustrating an example of a label map in a node ERc;

FIG. 18 is a diagram illustrating an example of a label map in a node GWRc;

FIG. 19 is a diagram illustrating an example of a label map in a node GWRb2;

FIG. 20 is a diagram illustrating an example of a label map in a node GWRb1;

FIG. 21 is a diagram illustrating an example of a label map in a node GWRa;

FIG. 22 is a diagram illustrating an example of a label map in a node ERa;

FIG. 24 is a diagram illustrating a specific example when a dynamic transmission bandwidth is determined;

FIGS. 26A to 26D are diagrams illustrating specific examples of the optimum LP determining processing;

DETAILED DESCRIPTION OF THE PREFERRED EMBODIMENTS

Figure 1:
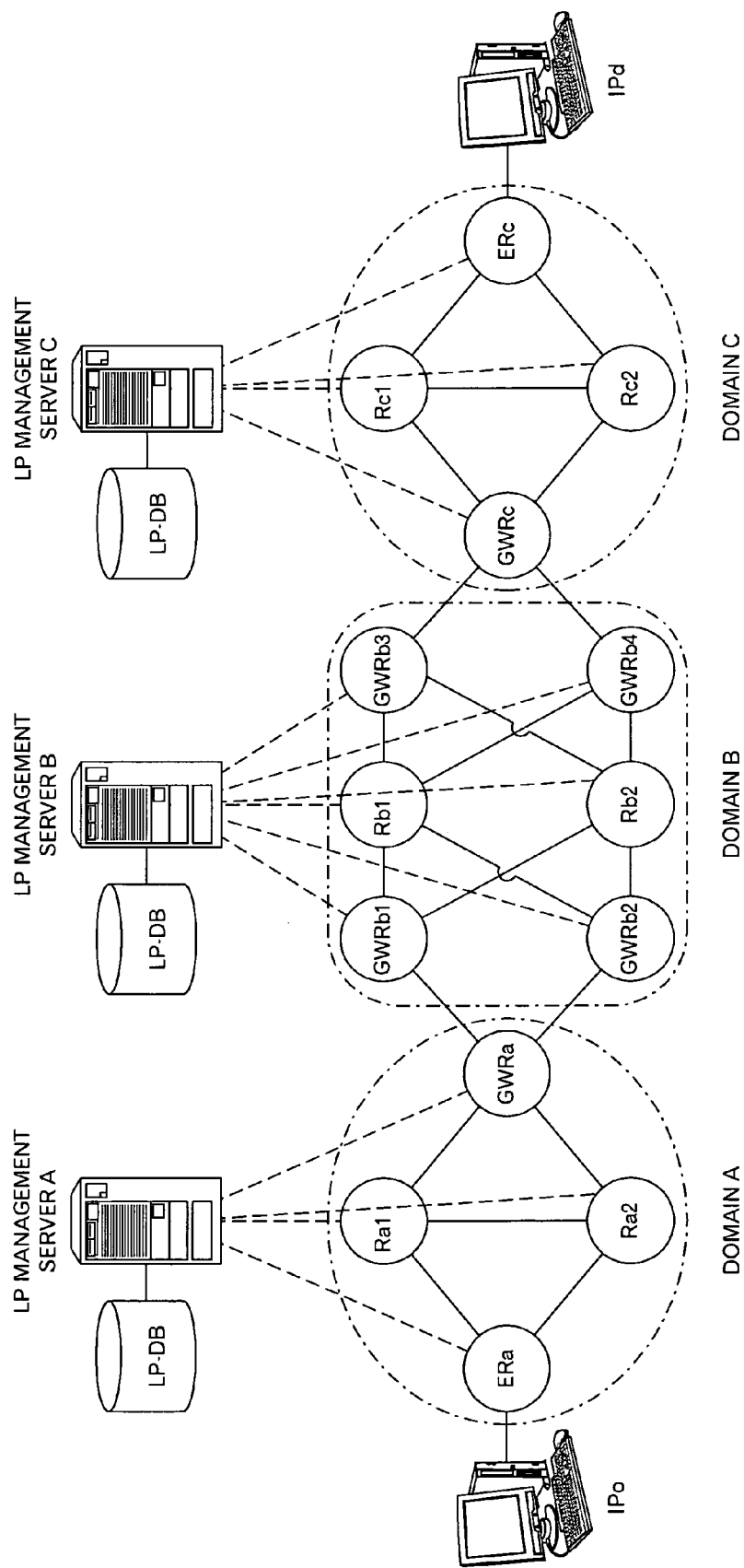
FIG. 1 is a diagram schematically to explain an outline of a network according to an embodiment of the invention.

FIG. 1 shows a conceptual diagram of a network according to one embodiment of the invention. In this embodiment, an LP management server A is connected to a domain A including routers, such as a node ERa (Edge Router), nodes Ra1 and Ra2, and a node GWRa (Gateway Router). An LP management server B is connected to a domain B including routers, such as nodes Rb1 and Rb2 and nodes GWRb1, GWRb2, GWRb3, and GWRb4. An LP management server C is connected to a domain C including routers, such as a node ERc, nodes Rc1 and Rc2, and a node GWRc. In addition, the node GWRa is connected to the nodes GWRb1 and GWRb2, and the node GWRc is connected to the nodes GWRb3 and GWRb4. Incidentally, a router having a link to a computer having a source address IPo (a group of IP addresses in a predetermined sub-network) or the like and a router having a link to a computer having a destination address IPd (a group of IP addresses in a predetermined sub-network) or the like are denoted as edge routers ER or nodes ER, and a router connected to a router in another domain is denoted as a gateway router GWR or a node GWR.

"LP" is an abbreviated word of a label switched path in MPLS (Multi Protocol Label Switching). The LP management server A, the LP management server B, and the LP management server C respectively function to determine an optimum path (LP) between arbitrary nodes in each domain. That is, routing is not controlled by each node as in the background art, but routing in the domain is intensively controlled by the LP management server. As represented by dotted lines in FIG. 1, the nodes are directly or indirectly controlled by the LP management servers. In order to carry out such a processing, each LP management server manages an LP-DB storing data concerning the LP. The data stored in the LP-DB will be described later in detail.

Figure 2A:
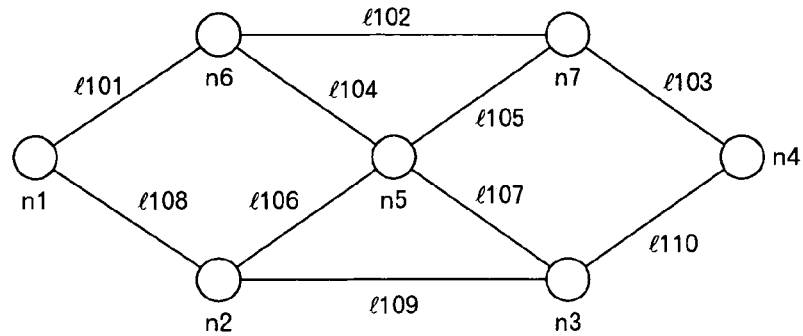
FIGS. 2A to 2C are conceptual diagrams illustrating the network.

Here, the basic concept of routing in a domain will be described. As shown in FIG. 2A, a link 1101 is provided between a node n1 and a node n6, and a link 1102 is provided between the node n6 and a node n7. A link 1103 is provided between the node n7 and a node n4, and a link 1104 is provided between the node n6 and a node n5. A link 1105 is provided between the node n5 and the node n7, and a link 1106 is provided between the node n5 and a node n2. A link 1107 is provided between the node n5 and a node n3, and a link 1108 is provided between the node n2 and the node n1. A link 1109 is provided between the node n2 and the node n3, and a link 1110 is provided between the node n3 and the node n4.

Figure 2B:
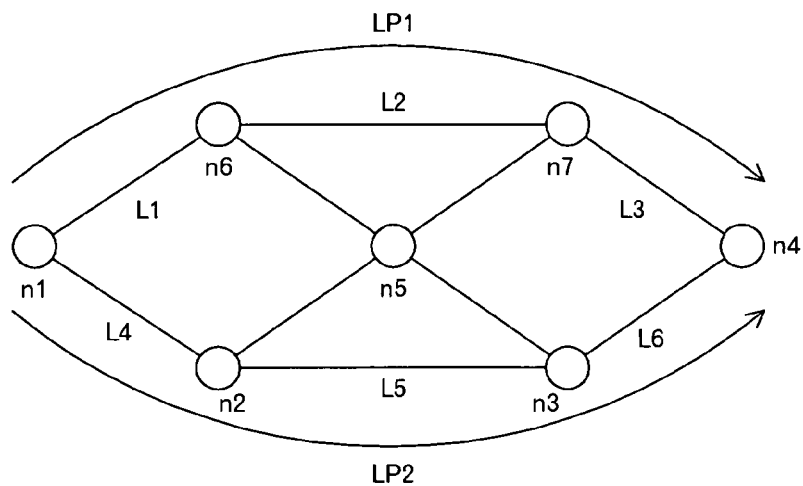

In such a network, as shown in FIG. 2B, LP1 and LP2 exist as paths from the node n1 to the node n4. LP1 is composed of the link 1101, the link 1102, and the link 1103. In the case of the path LP1, a label L1 is assigned to the link 1101, a label L2 is assigned to the link 1102, and a label L3 is assigned to the link 1103. In addition, LP2 is composed of the link 1108, the link 1109, and the link 1110. In the case of the path LP2, a label L4 is assigned to the link 1108, a label L5 is assigned to the link 1109, and a label L6 is assigned to the link 1110.

Figure 2C:
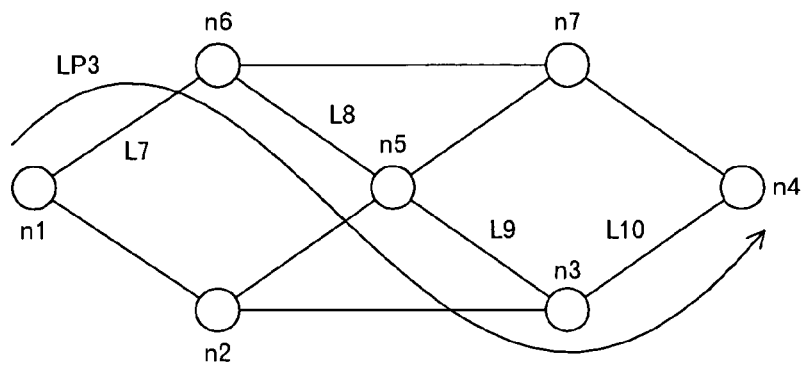

Furthermore, as shown in FIG. 2C, LP3 exists as another path from the node n1 to the node n4. LP3 is composed of the link 1101, the link 1104, the link 1107, and the link 1110. In the case of the path LP3, a label L7 is assigned to the link 1101, a label L8 is assigned to the link 1104, a label L9 is assigned to the link 1107, and a label L10 is assigned to the link 1110.

As such, the link 1101 is commonly used for LP1 and LP3, but different labels are assigned to the same link 1101 in such a manner that the label L1 is assigned thereto in LP1, and the label L7 is assigned thereto in LP3. That is, basically, different labels are assigned to the same link according to LP even in a case where the same link is used. In order words, a label is uniquely assigned in LP. When a label is specified, LP is also specified. Thus, a link relating to a label next to the specified label can be specified. For example, when the label L8 is designated, the link 1104 relating to the label L8 is specified, and the next label L9 is also specified, and then the link 1107 relating to the label L9 is also specified. Therefore, forward routing is possible in each node. Incidentally, as for the priority class, LP is not prepared for every priority class, but an LP method in which the priority class is set as a sub-set of the LP is used as a premise.

In FIG. 2A, LP from the node n1 to the node n4 is discussed, and the same labels as those used for the forward LP are used for reverse LP (RLP: Reverse Label Switched Path) in this embodiment. That is, the reverse LP symmetric with respect to the forward LP is used. In this way, it is possible to commonly use routing information for downlink and uplink, and thus to reduce the amount of data to be managed. More specifically, for example, in the reverse routing, when the label L3 is specified, the label L2 is specified as the next label. That is, it is possible to carry out reverse routing in each node.

Figure 3A:
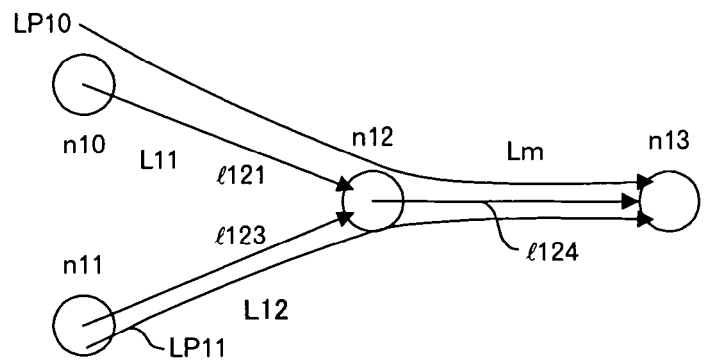
FIGS. 3A and 3B are diagrams to explain a virtual label.
Figure 3B:
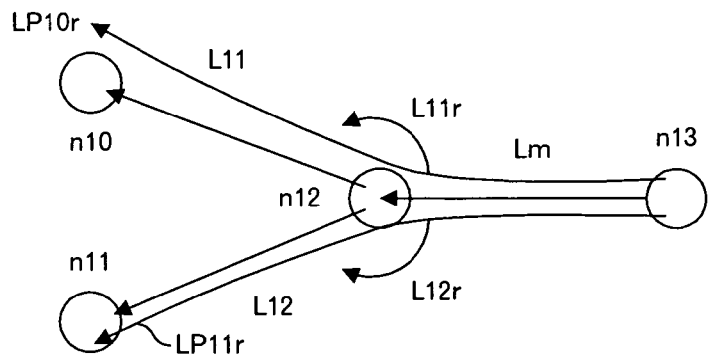

However, according to this configuration, as the number of LPs and the number of nodes become larger, the number of routers ((the number of LPs)×(the number of nodes)) is large. Therefore, the amount of data to be managed is increased. Then, in this embodiment, a label merging is adopted. A simple example is shown in FIGS. 3A and 3B. As shown in FIG. 3A, in a network including nodes n10, n11, n12, and n13, a path from the node n10 to the node n12 is denoted as LP10, and a path from the node n11 to the node n12 is denoted as LP11. In addition, a link from the node n10 to the node n12 is denoted as 1121, and a link from the node n11 to the node n12 is denoted as 1123. A link from the node n12 to the node n13 is denoted as 1124. In such a case, the same link 1124 is used for the LP10 and LP11, but it is necessary to register different labels every LPs according to the explanation for FIGS. 2A to 2C. However, as described above, in order to reduce the amount of data to be managed, only one label Lm is assigned to the link 1124 by merging the labels for the link 1124. That is, LP10 is composed of the label L11 and the label Lm, and the LP11 is composed of the label L12 and the label Lm. In the node n12, when the label L11 is specified, the label Lm can be specified as the next label for LP10. Similarly, in the node n12, when the label L12 is specified, the label Lm can be specified as the next label for the LP11.

As shown in FIG. 3B, in the case of reverse direction, that is, LP10r from the node n13 to the node n10 and LP11r from the node n13 to the node n11, the reverse direction is not automatically specified from the forward direction according to the explanation for FIGS. 2A to 2C. That is, even when the label Lm is specified, it is impossible to specify the LP10r or LP11r. As a result, because the next label cannot be specified, it is impossible to carry out the routing. Therefore, in this embodiment, in order to makes it possible to carry out the routing even when the label merging is carried out, a virtual label is introduced to carry out branching in the branch node n12.

The virtual label functions to specify LP, for example, a branch destination label. In an example of FIG. 3B, at the node n12, branch to the label L11 is carried out according to the virtual label L11r. That is, when the LP10r is used, the node n13 transmits a packet, which specifies both the label Lm and the virtual label L11r. Meanwhile, when the LP11r is used, similarly, the node n13 transmits a packet, specifies both the label Lm and a virtual label L12r. The following can be used as the virtual label: (a) a unique head label name of the forward LP in a domain; (b) a unique label name in a domain corresponding to the number of path multiplicities of a source network address; (c) a unique label name corresponding to the number of path multiplicities and a source prefix or the like.

Incidentally, because the routing within the domain is discussed in FIGS. 3A and 3B, an additional mechanism, which will be described later, is needed to handle a path between domains.

Figure 4:
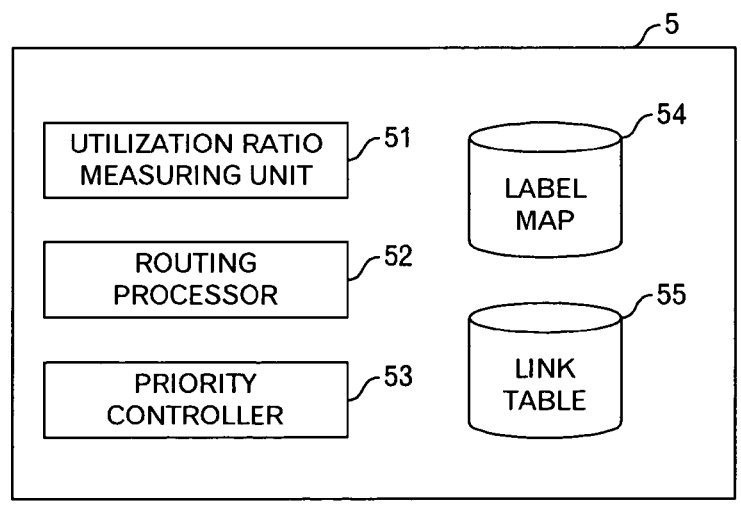
FIG. 4 is a functional block diagram of a router.

Next, a configuration for realizing the basic mechanism shown in FIGS. 2A to 2C and FIGS. 3A and 3B will be described below. FIG. 4 shows a functional block diagram illustrating a router disposed at a node. A router 5 includes a label map 54, a link table 55, a priority controller 53, which conventionally exists, to carry out a processing for priority control such as 8-class priority control, a utilization ratio measuring unit 51 for measuring the utilization ratio of a link for each priority class, and a routing processor 52, which is operatively associated with the priority controller 53, to carry out a packet routing, referring to the routing map 54 and the link table 55.

The label map 54 of the node n12 in FIG. 3A includes data shown in FIG. 5, for example. That is, a table shown in FIG. 5 includes, from the left side thereof, a first label column, a virtual label column, and a second label column, and each record corresponds to one LP. In FIG. 5, data for LP10 is registered in the first record, and because the node n12 is a branch node, the virtual label L11r and the label Lm are registered therein in association with the label L11. Therefore, when a packet to which the label L11 is attached is received from the node n10, it is determined based on the label map 54 that the packet should be transferred to the label Lm. In contrast, when a packet to which the label Lm and the virtual label L12r are attached are received, it is determined based on the label map 54 that the packet should be transferred to the label L12.

Meanwhile, the link table 55 of the node n12 in FIG. 3A includes data shown in FIG. 6, for example. That is, the table shown in FIG. 6 has a link column and a label column, and links and labels are associated with each other therein. As such, when a label can be specified, a link can also be specified. As a result, aport connected to a cable constituting the link in the router 5 is also specified. Therefore, it is possible to carry out the packet routing.

The utilization ratio measuring unit 51 of the router 5 regularly measures the utilization ratios of the links and notifies them to the LP management server. However, when the utilization ratio varies within a predetermined range, the notice may be omitted. Incidentally, in a case where a bottleneck link is included in the links connected to the router 5, the LP management server transmits an intensive monitoring instruction to the router 5. Therefore, when receiving the intensive monitoring instruction, the utilization ratio measuring unit 51 shortens a monitoring period for the bottleneck link. In a case where, if the utilization ratio varies beyond a predetermined range, its notice is transmitted to the LP management server, the utilization ratio measuring unit 51 carries out a processing for narrowing the predetermined range, or the like.

Next, examples of data stored in the LP-DB to realize the basic mechanism shown in FIGS. 2A to 2C and FIGS. 3A and 3B are shown in FIGS. 7 to 9. FIG. 7 shows an example of a link table. Similar to FIG. 6, the table shown in FIG. 7 includes a column of a link Lid and a column of a label La, and a relationship between a link and a label assigned to the link is registered in the table. Data of links for the entire network is registered in the LP-DB. In a case where the configuration of the network is changed, data in the table is also changed.

FIG. 8 shows an example of a link data table. The table shown in FIG. 8 includes a column of a link Lid, a column for a static bandwidth Bs of a link, a column for ID RTid of routers connected to both ends of the link, and a column of the link utilization ratio Pri-ρ for each priority. For the simplicity of explanation, it is assumed that priorities of "0" and "1" exist. The utilization ratio measured by the utilization ratio measuring unit 51 in the router 5 is transmitted to the corresponding LP management server, and is then registered in this table.

FIG. 9 shows an example of an LP table. The table shown in FIG. 9 includes a column for a source network address set number (SNo) that indicates a set of network addresses (when one network address exists, the set of network addresses includes the network address, and when two or more network addresses exist, the set of network addresses includes a representative network address) under the control of a source edge router, a column for a destination network address set number (SNd) that indicates a set of network addresses under the control of a destination edge router, a column for an order of the static transmission bandwidth Bs of LP that connects SNo and SNd, a column to indicate the state of a failure (uplink U/downlink D), a column for a virtual label in the reverse LP (RLP) (for example, SNo is used. SNo corresponds to a destination side, because of the reverse direction), a column for the LP static transmission bandwidth calculated from the band capacities of respective links constituting the LP, a column for a label BsBN corresponding to a bottleneck link causing the static transmission bandwidth, a column of a transmission bandwidth calculating method Cal to register a case (M) in which a packet size is random or a case (D) in which a packet size is uniform, a column of a priority (Pri) to distinguish a best effort (O) from a highest priority (1), a column of an uplink-side dynamic transmission bandwidth BdU, a column of a label BdUBN corresponding to the bottleneck link causing the uplink-side dynamic transmission bandwidth, a column of a downlink-side dynamic transmission bandwidth BdD, a column of a label BdDBN corresponding to the bottleneck link causing the downlink-side dynamic transmission bandwidth, and a label data column. The label data column includes labels La constituting the LP, uplink-side utilization ratios ρU of links corresponding to the labels, and downlink-side utilization ratios ρD of the links corresponding to the labels. Incidentally, although an example is described in which the priority has only two stages, in general, it can have N stages (N is a positive integer).

Next, a basic processing carried out in the LP management server to realize the basic mechanism shown in FIGS. 2A to 2C and FIGS. 3A and 3B will be described with reference to FIGS. 10 to 14A. The LP management server acquires data of the bandwidth for each link and registers it into the linkdata table (FIG. 8) (step 1). The data may be automatically acquired from nodes in the network, or data input by an administrator may be acquired. Next, the LP management server calculates the static transmission bandwidth for each LP on the basis of LP definition, which is separately held, and specifies an LP group LPGsm between edge routers (that is, between a source node and a destination node) on the basis of the calculated static transmission bandwidth (step S3).

Figures 11A, 11B:
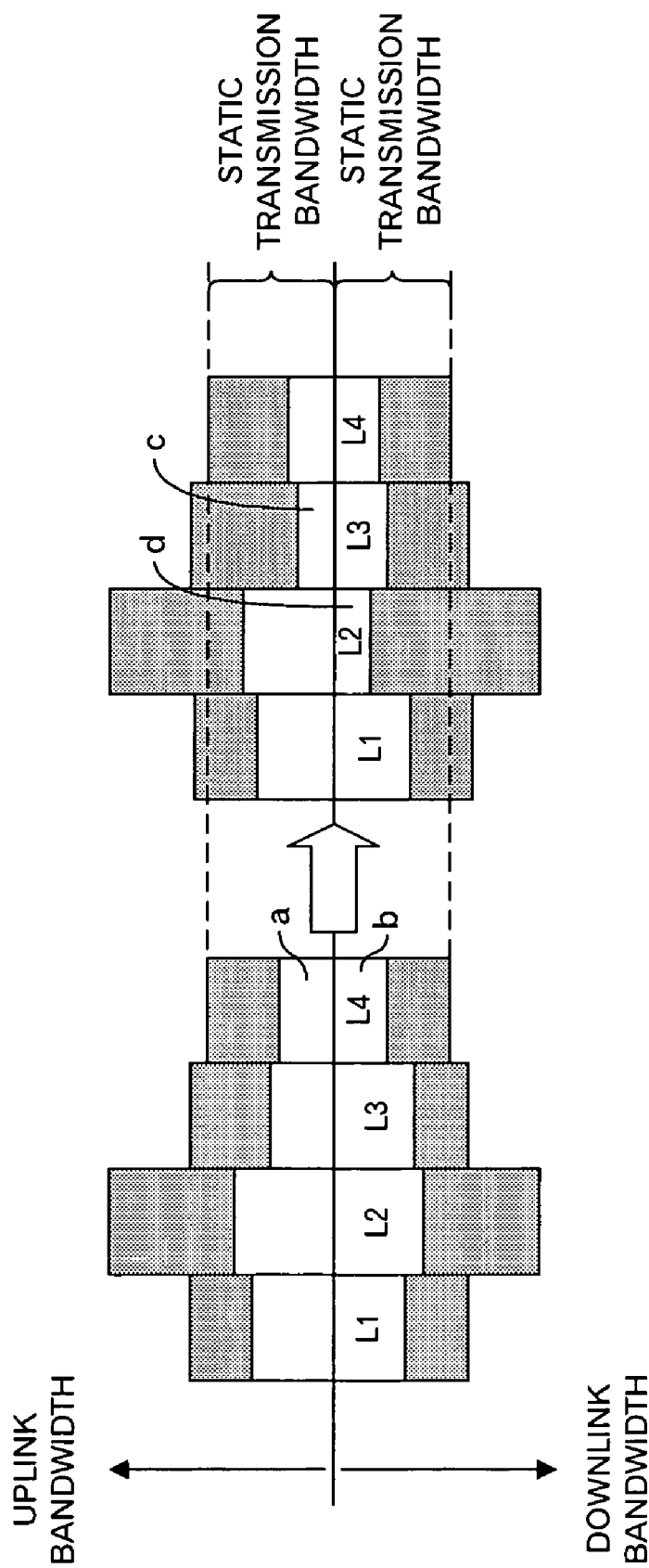
FIGS. 11A and 11B are diagrams to explain a static transmission bandwidth and a dynamic transmission bandwidth.

The static transmission bandwidth for each LP will be described with reference to FIG. 11A. In FIG. 11A, the bandwidth of a label (specifically, the corresponding link) is represented by the length of an upper-side bar in uplink, and is represented by the length of a lower-side bar in downlink. In an example of FIG. 11A, a label L2 has the largest bandwidth, and a label L4 has the smallest bandwidth. Because the static transmission bandwidth of the entire LP is generally restricted by the link having the smallest bandwidth, the bandwidth of the label L4 is set to the static transmission bandwidth of the LP in FIG. 11A. Incidentally, there is a case in which bandwidths is different from each other in uplink and downlink. In such a case, the static transmission bandwidths of the LP may be different from each other in downlink and uplink. Labels corresponding to the bottleneck links may differ from each other in downlink and uplink. In this way, the n LPs (n=3 in FIG. 9) having one of the n top-ranked static transmission bandwidth between specific edge routers are selected to constitute the LP group LPGsm. Therefore, by limiting targets whose dynamic transmission bandwidth should be calculated based on the static transmission bandwidth, it is possible to reduce the amount of calculation. Data for LPs included in each LP group LPGsm (for example, the calculated static transmission bandwidth, labels constituting the LP, and a virtual label, if necessary) is stored in the LP table (FIG. 9).

Next, the LP management server obtains data concerning the utilization ratios of links from each router, and then stores the data into the link data table (FIG. 8) and the LP table (FIG. 9) (step S5). As described above, the utilization ratio of a link is acquired for each priority level. Then, it calculates the dynamic transmission bandwidths of LPs in each LP group LPGsm, and stores the calculation results into the LP table (FIG. 9) (step S7). The dynamic transmission bandwidth will be described with reference to FIGS. 11A and 11B. In examples of FIGS. 11A and 11B, a hatched portion in each bar indicating the static transmission bandwidth of the label shows a used bandwidth. In actual communication, portions other than the bandwidth used in the static bandwidth of each label are used. That is, in FIGS. 11A and 11B, the length of a white portion in the bar indicates an available bandwidth. In FIG. 11A, both white portions in both the uplink bar of the label L4 and the downlink bar of the label L4 have the smallest length in uplink and downlink, and the dynamic transmission bandwidth of the LP is specified by the narrowest uplink bandwidth a and the narrowest downlink bandwidth b of the label L4. However, it is not necessary that the same label has the narrowest bandwidth in uplink and downlink. In addition, the utilization ratio of each label depends on time. For example, the state shown in FIG. 11A is changed to the state shown in FIG. 11B with the passage of time. Here, the uplink used bandwidth of the label L3 becomes large, and the downlink used bandwidth of the label L2 becomes large. Therefore, the dynamic transmission bandwidth is specified by the smallest bandwidth c of the label L3 in uplink, and is specified by the smallest bandwidth d of the label L2 in downlink.

Figure 12:
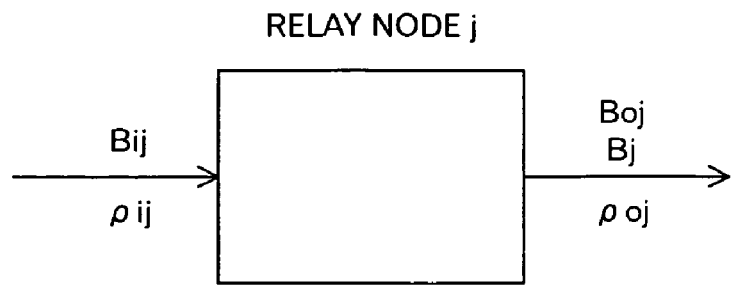
FIG. 12 is a diagram illustrating relationships between a relay node and a utilization ratio, and between the relay node and a dynamic bandwidth.

The dynamic transmission bandwidth is calculated by the following method, specifically. As shown in FIG. 12, in a relay node j, an input-side bandwidth, an input-side utilization ratio, an output-side bandwidth, an output-side utilization ratio, and an output-side dynamic bandwidth are respectively denoted by letters $B_{ij}$, $\rho_{ij}$, $B_{oj}$, $\rho_{oj}$, and $B_j$. In this embodiment, the dynamic bandwidth $B_j$ is calculated by using a queue model. When the packet side is variable, $B_j = B_{oj}(1-\rho_{oj})$ is calculated according to an M/M/1 model. In addition, when the packet side is fixed, $B_j = B_{oj}(1-\rho_{oj})(1-\rho_{oj}^2/2)$ is calculated according to an M/D/1 model. When a priority class is defined, the dynamic bandwidth is approximately calculated by replacing the utilization ratio $\rho_{oj}$ of each priority class with the utilization ratio totaled for classes higher than the priority class. A dynamic transmission bandwidth B of LP is calculated to be equal to Min{$B_j$} by the dynamic bandwidths $B_j$ for all links constituting the LP.

Figure 13:
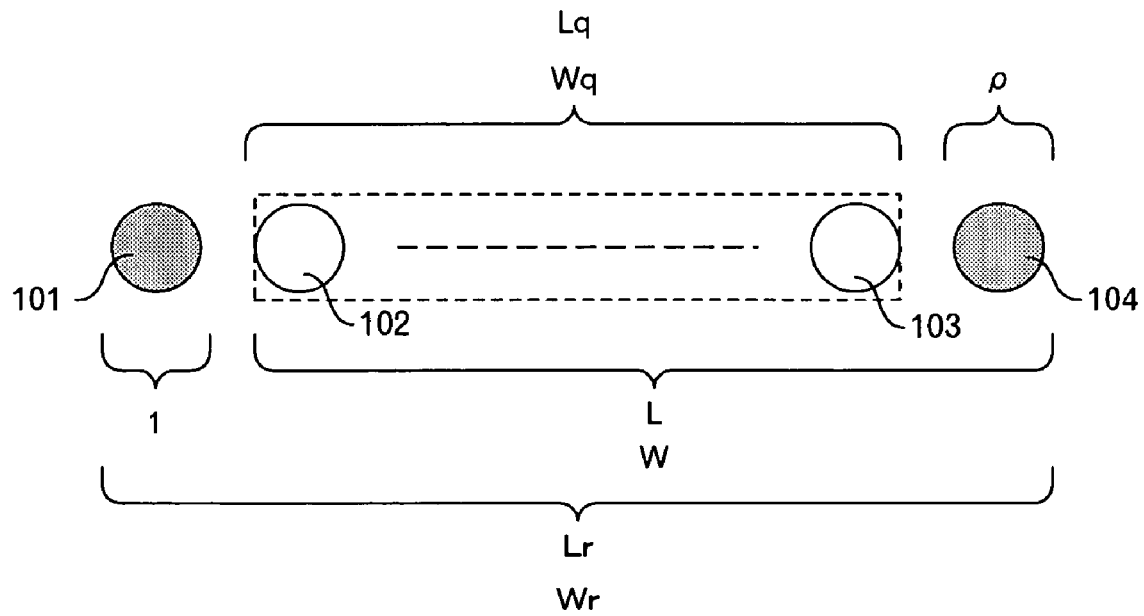
FIG. 13 is a diagram illustrating a queue model.

A supplementary explanation for the queue model will be carried out below. Here, the queue model shown in FIG. 13 is assumed. That is, the queue model includes an element 104 currently being serviced, elements 102 and 103 in a queue, and a latest reached element 101. In this case, it is assumed that a queue length between the elements 102 and 103 is "Lq". It is also assumed that, in a case where the queue length of the element 102 is "Lq", the time to forward a packet having a size P (bit) is "Wq". In addition, it is assumed that the queue length of the element 104 currently being serviced is "ρ", the queue length of the latest reached element 101 is "1", and the sum (Lq+ρ) of the queue length Lq and the queue length ρ of the element 104 currently being serviced is "L". It is also assumed that, in a case where the length (Lq+ρ) is "L", the time to forward a packet having a size P (bit) is "W", and a queue length "L+1" including the queue length of the latest reached element 101 is "Lr". In this case, it is assumed that waiting time is "Wr".

Then, in a case where the M/M/1 model in which the size of a packet is not fixed is used, the following expressions are established: $Lq=\rho^2/(1-\rho)$; $L=\rho/(1-\rho)$; and $Lr=1/(1-\rho)$. Incidentally, because an input buffer is actually finite, an M/M/1 model (N is the length of a buffer) is preferable. However, the buffer can have a large length, and thus the M/M/1 model is sufficient in this embodiment.

Therefore, the following expression is established:

$$W=(P/B')\times Lr=(P/B')/(1-\rho)=P/B'' \quad (1),$$

where B' represents a static bandwidth (bps), and B" represents a dynamic bandwidth.

By modifying the expression (1), the following expressions are obtained:

$(1/B')/(1-\rho)=1/B''$, and $B''=B'\times(1-\rho)$.

As described above, the dynamic transmission bandwidth is equal to the remaining bandwidth obtained by subtracting a used bandwidth from the static bandwidth.

Further, in a case where the M/D/1 model in which the size of a packet is fixed is used, the following expressions are established: $Lq'=1/2\times\rho^2/(1-\rho)$; $L'=(\rho-1/2\times\rho^2)/(1-\rho)$; and $Lr'=(1-1/2\times\rho^2)/(1-\rho)$.

Then, the following expression is obtained:

$$W=(P/B')\times Lr=(P/B')\times(1-\rho^2/2)/(1-\rho)=P/B'' \quad (2).$$

By modifying the expression (2), the following expressions are obtained:

$(1/B)\times(1-\rho^2/2)/(1-\rho)=1/B''$, and $B''=B'\times(1-\rho)/(1-\rho^2/2)$.

As described above, the dynamic transmission bandwidth in the case in which the size of a packet is fixed is wider than that in the case in which the size of a packet is not fixed. Because the size of a packet is smaller than 1500, the actual dynamic transmission bandwidth is close to that in the case in which the size of a packet is fixed.

Figure 10:
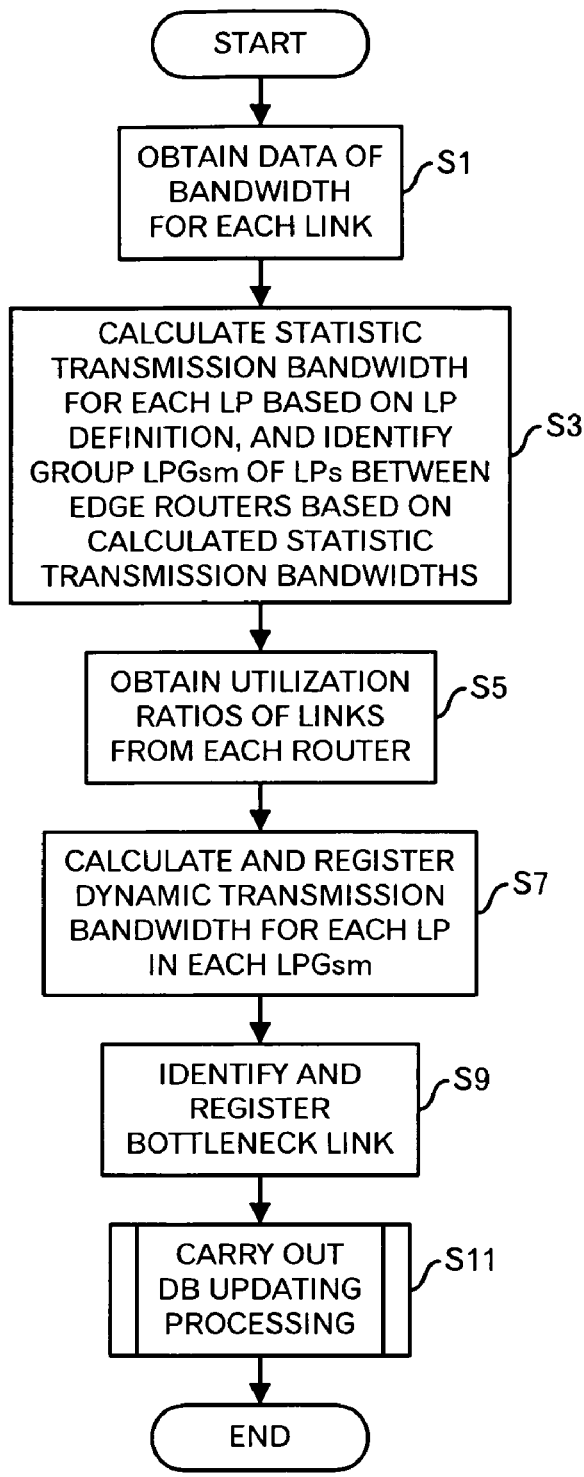
FIG. 10 is a diagram showing a flow chart of a basic processing by the LP management server.

Returning to the explanation of FIG. 10, because the dynamic transmission bandwidth B=Min{$B_{oj}$} is calculated at the step S7, the LP management server identifies a bottleneck link causing Bj that limits the dynamic transmission bandwidth B, and registers the bottleneck link into the LP table (FIG. 9) (step S9). Incidentally, a bottleneck link causing the bandwidth that limits the statistic transmission bandwidth is similarly identified and is then registered into the LP table (FIG. 9). Subsequently, it carries out a DB updating processing on the LP-DB (step S11).

The DB updating processing will be described with reference to FIG. 14A. First, the LP management server transmits an intensive monitoring instruction to a router corresponding to the static bottleneck link BNL (step S21). For example, data concerning a router, which monitors each link, is separately stored, and the router is identified, on the basis of such data, by using the static bottleneck network identified in the step S9. In addition, the utilization ratio measuring unit 51 of the router that received the intensive monitoring instruction more frequently monitors the static bottleneck link and/or changes a threshold value used to judge whether or not a utilization ratio updating notice is transmitted. Further, it transmits the intensive monitoring instruction to a router corresponding to the dynamic bottleneck link BNL (step S23). Then, the similar processing as that in the step S21 is carried out in the router. In a case where the static bottleneck link and the dynamic bottleneck link are the same, the step S23 may be skipped.

Thereafter, the LP management server waits the utilization ratio updating notice from each node in a domain (step S25). Then, in a case where the utilization ratio updating notice is received from any router, it registers data of the utilization ratio into the link data table (FIG. 8) and the LP table (FIG. 9), and calculates the dynamic transmission bandwidth of an LP associated with the link whose utilization ratio is updated and registers the calculated dynamic transmission bandwidth into the LP table (FIG. 9) (step S27). The calculation of the dynamic transmission bandwidth is the same as that carried out in the step S7 of FIG. 10, and thus a description thereof will be omitted. In the step S27, because it can be found out which label (i.e. link) in an LP is the bottleneck link BNL, it identifies the label of the bottleneck link (step S29). Then, it determines whether the bottleneck link registered in the LP table (FIG. 9) and the bottleneck link lately identified are identical to each other, that is, whether the bottleneck link is shifted (step S31). When the bottleneck link is not shifted, the processing returns to the step S25.

On the other hand, in a case where it determined that the bottleneck link was shifted, the LP management server registers the label of the bottleneck link identified in the step S29 into the LP table (FIG. 9) (step S32). In addition, it transmits the intensive monitoring instruction to a router corresponding to the shifted bottleneck link (step S33). Then, the same processing as that carried out in the step S23 is carried out. In addition, it determines whether or not the preceding bottleneck link is a static bottleneck link, by referring to the LP table (FIG. 9). In a case where the preceding bottleneck link is not a static bottleneck link, it transmits an intensive monitoring cancellation notice to a router corresponding to the preceding bottleneck link (step S35). The router that received the intensive monitoring cancellation notice returns utilization ratio measurement conditions to their original states. That is, the router returns a measurement period to a default value, and the threshold value used to judge whether or not the utilization ratio updating notice is transmitted, to its original value.

The steps S25 to S35 are repeatedly carried out until conditions required to terminate a processing, such as the reception of an explicit processing terminating instruction, are satisfied (step S37).

Figure 14A:
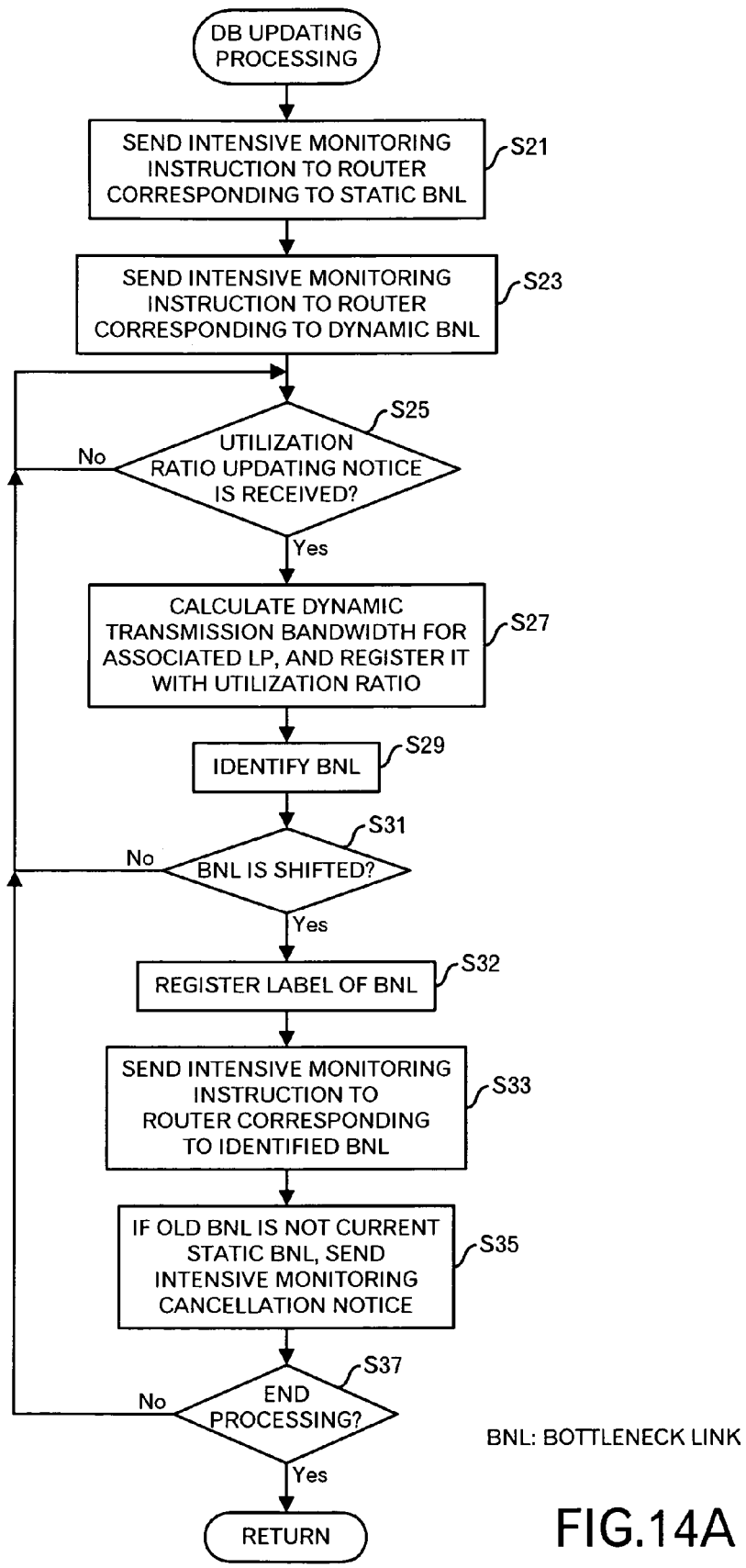
FIG. 14A is a diagram showing a flowchart of a DB updating processing.

By carrying out the processing shown in FIG. 14A, it becomes possible to intensively monitor a bottleneck link having much influence on the performance of a network and thus to reduce unnecessary monitoring overhead. Accordingly, it becomes possible to effectively update the LP table (FIG. 9). In addition, the routing can be carried out in considering the state of a network. Incidentally, it is possible to configure the router to notify the current transmission bandwidth to all relevant routers to make each router determine whether the router itself corresponds to a bottleneck link and to notify the determination result to the LP management server.

[Method of Constituting Optimum Path Between Domains]

Although the basic mechanism of routing in a domain has been described with reference to FIGS. 2 to 14A, next the advanced mechanism of routing between domains will be described. In this embodiment, the LP management server manages the routing in its own domain, and only receives necessary information with respect to other domains. Incidentally, in a case where LP from an edge router in the domain A to an edge router in the domain C is constituted as shown in FIG. 1, it is assumed that the range of the domain A is from a node Era to a node GWRa, the range of the domain B is from a link connected to the node GWRa to a node GWRb2, and the range of the domain C is from a link connected to the node GWRb2 to a node ERc, as shown in FIG. 14B.

Figure 14B:
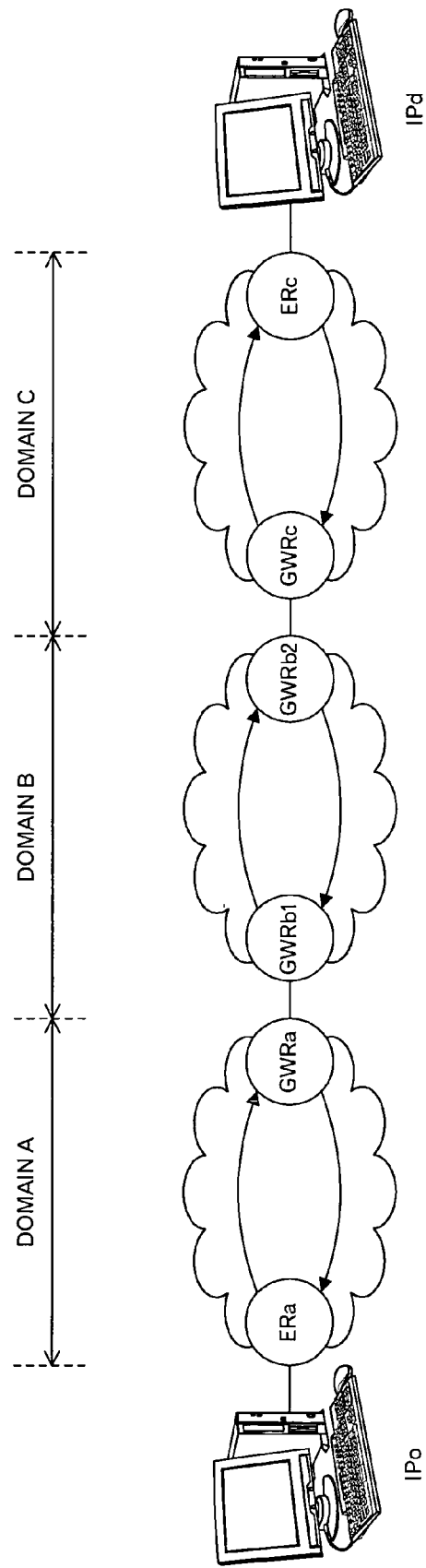
FIG. 14B is a diagram showing to explain the ranges of domains.
Figure 15:
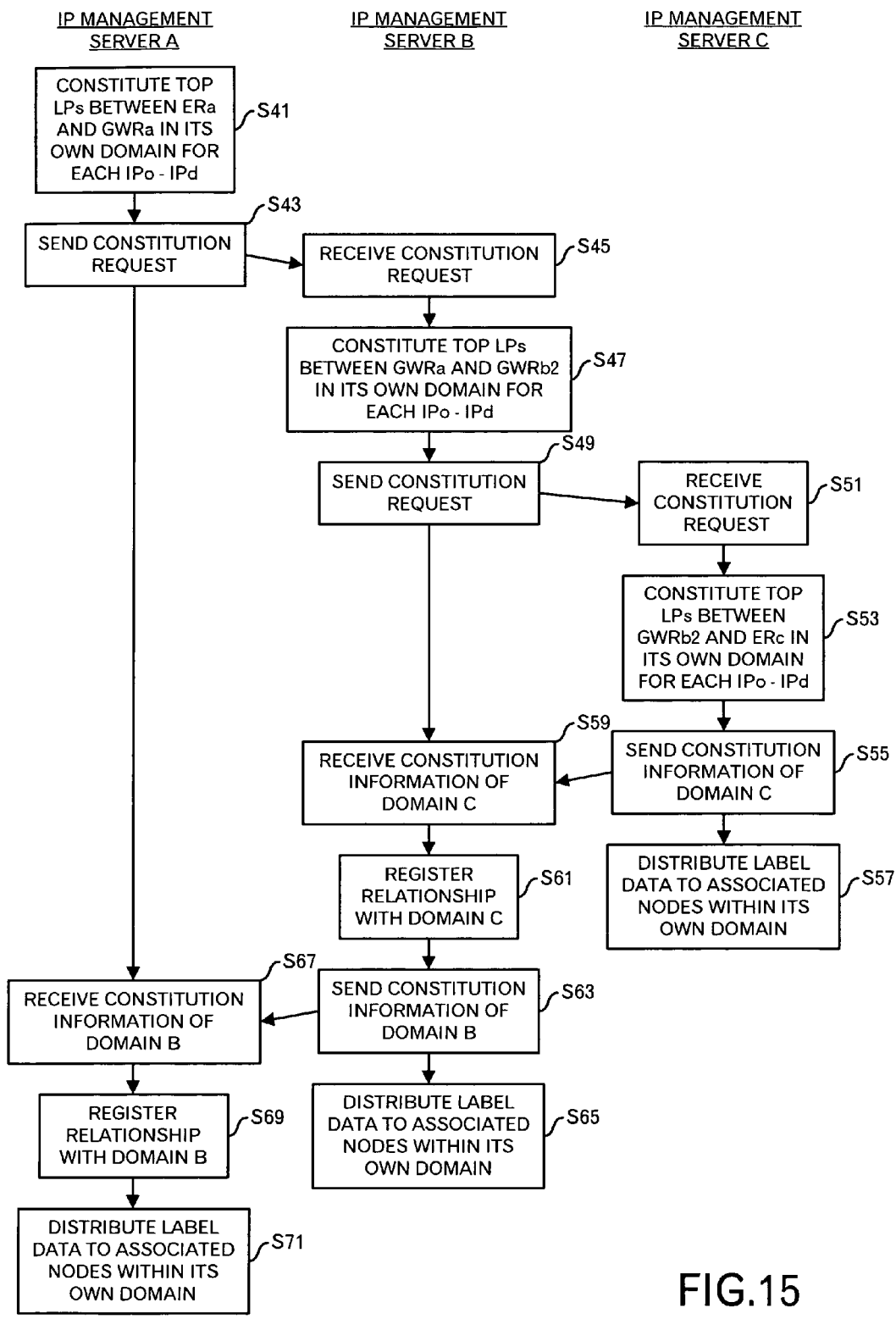
FIG. 15 is a diagram showing a flowchart of a processing to constitute an LP through plural domains.

In the state shown in FIG. 14B, in a case where LP is constituted from a source address IPo, which is included in an IP address group of a computer connected to the domain A, to a destination address IPd, a following processing shown in FIG. 15 is carried out. That is, an LP management server A for managing the domain A constitutes a top LP group MPSGsmA in the domain A on the basis of the static transmission bandwidth (step S41). Specifically, a predetermined number of top LPs are constituted from a node ERa associated with the source address IPo to a node GWRa associated with the domain C connected to the computer having the destination address IPd, on the basis of the static transmission bandwidth stored in the LP-DB. Incidentally, the first label (for example, LPa) of LP in the domain A associated with the source address is an LP name of a path in the domain A and entire LP from the source address IPo to the destination address IPd. However, in a case where the uniqueness of the label is not ensured only in the domain, a domain name ASa (autonomous system) is attached to the head to identify LP in the inter-domain routing.

The constitution result of LP is stored in the LP-DB connected to the LP management server A. An example of an LP table for LP between domains, which is stored in the LP-DB, is shown in FIG. 16. Data structure shown in FIG. 16 has an extended form of the data structure shown in FIG. 9, but a portion of the data, which is not used for the following description, is omitted. The table shown in FIG. 16 includes a column of a source network address set number SNo that indicates a set of network addresses (when one network address exists, the set of network addresses includes the network address, and when two or more network addresses exist, the set of network addresses includes a representative network address) under the control of a source edge router, a column for a destination network address set number SNd that indicates a set of network addresses under the control of a destination edge router, a column of an LP order LP#, a column for the static transmission bandwidth Bs of LP, which is calculated from the band capacities of respective links constituting LP in its own domain, a column for the static transmission bandwidth Bs total of the entire LP, a column for an uplink-side dynamic transmission bandwidth BdUa in its own domain, a column for an downlink-side dynamic transmission bandwidth BdDa in its own domain, a column for the uplink-side dynamic transmission bandwidth BdUtotal of the entire LP, a column for the downlink-side dynamic transmission bandwidth BdDtotal of the entire LP, and a label data column. The label data column includes a label (La) constituting LP in its own domain, an uplink-side utilization ratio (ρU) of a link corresponding to the label, and a downlink-side utilization ratio (ρD) of the link corresponding to the label. Incidentally, because the aforementioned data set can be acquired in the domain A, it is registered in the LP-DB. However, because it is not difficult to obtain data in the other domains, data capable of being acquired from the associated domains is registered. In an example of FIG. 14B, as data for the domain B, a label (ASb.LPb1) assigned to a link from the node GWRa, and uplink and downlink dynamic transmission bandwidths at a certain point of time in the domain B are registered. In addition, as data for the domain C, data for identifying the domain C (for example, the address of the LP management server C, the label of the first link in the domain C or the like), and uplink and downlink dynamic transmission bandwidths at a certain point of time in the domain C are registered. Data of the dynamic transmission bandwidth is not registered in the processing flow shown in FIG. 15, and data of the dynamic transmission bandwidth in the domain A is automatically updated according to the flow shown in FIG. 14A at any time, and the dynamic transmission bandwidth for other domains is registered when actual routing is required. In addition, data for the domains B and C is not registered at this stage.

The similar data is registered in the LP-DBs connected to the LP management servers B and C. However, in the LP-DB of the LP management server B, data for the domain A includes data required for connection to the domain A (an LP name and a label assigned to a link from the node GWRa), and data for the domain C includes a label assigned to a link from the node GWRb2. In addition, in the LP-DB of the LP management server C, data for the domain A includes data for specifying the domain A (for example, an LP name), and data for the domain B includes a label assigned to a link from the node GWRb2. The dynamic transmission bandwidths of the other domains are not needed in domains other than the domain A associated with the source address.

Returning to the explanation of FIG. 15 again, the LP management server A for managing the domain A transmits a constitution request to the LP management server B in the domain B connected to the node GWRa (step S43). The configuration request includes a source address IPo and a destination address IPd, and includes a LP name (for example, ASa.LPa), an IP address of the node GWRa, which is the last node connected in the domain A, and data of the static transmission bandwidth for each LP in of LP included in a top LP group MPLSGsmA.

The LP management server B for managing the domain B receives the constitution request from the LP management server A (step S45), and constitutes a top LP group MPLSGsmB in the domain B on the basis of the total static transmission bandwidths in which the static transmission bandwidth in the domain A, which is included in the constitution request, is taken into account (step S47). More specifically, a predetermined number of top LPs are constituted, on the basis of the total static transmission bandwidths from the node GWRa to the node GWRb2 associated with the domain C connected to a computer having a destination address IPd. Here, the total static transmission bandwidth is calculated taking into account the static transmission bandwidth in the domain A, which is included in the constitution request, and the static transmission bandwidth of the domain B, which is stored in the LP-DB. Incidentally, "LPb" is used as the name of LP in the domain B. The constitution result is stored into the LP-DB connected to the LP management server B.

Further, the LP management server B for managing the domain B transmits a constitution request to the LP management server C of the domain C connected to the node GWRb2 (step S49). The configuration request includes a source address IPo and a destination address IPd, and includes a name (for example, ASa.LPa) of LP, an IP address of the node GWRb2, which is the last node connected in the domain B, and data of the total static transmission bandwidth for each LP of the top LP group included in the received constitution request.

The LP management server C for managing the domain C receives the constitution request from the LP management server B (step S51), and constitutes a top LP group MPLSGsmC of the domain B on the basis of the total static transmission bandwidths in which the sub-total static transmission bandwidth for the domain A and the domain B is taken into account (step S53). More specifically, a predetermined number of top LPs are constituted, on the basis of the total static transmission bandwidths from the node GWRb2 to the node ERc connected to the computer having the destination address IPd. Here, the total static transmission bandwidth is calculated taking into account the sub-total static transmission bandwidth for the domains A and B, which is included in the constitution request and the static transmission bandwidth of the domain C stored in the LP-DB. "LPc" is used as the name of LP in the domain C. The constitution result is stored into the LP-DB connected to the LP management server C.

When the constitution of LP is carried out until this stage, a path in the domain A, a path between the domain A and domain B, a path in the domain B, a path between the domain B and the domain C, and a path in the domain C are determined. Therefore, the LP management server C for managing the domain C transmits constitution information of the domain C to the LP management server B for managing the domain B (step S55). The constitution information of the domain C includes a source address IPo and a destination address IPd, and includes a name (for example, ASa.LPa) of LP, an IP address of the node GWRc, which is the first node connected in the domain C, data of the total static transmission bandwidth (in some cases, data of the static transmission bandwidth in the domain C), and a label (ASc.LPc) of the first link connectedto the last node GWRb2 connected in the domain B for each LP of the top LP group, which is included in the received constitution request.

Further, the LP management server C for managing the domain C distributes label data to nodes in its own domain, which are associated with LP included in the top LP group MPLSGsmC, and causes the node to store it into the label map 54 (step S57). FIG. 17 shows an example of data stored in the label map 54 of the node ERc. The table shown in FIG. 17 includes, from the left side thereof, a first label column, a virtual label column, and a second label column, and the virtual label column includes two columns, unlike the table shown in FIG. 5. In this embodiment, a label (a label LPc1 or LPc2 when two LPs are constituted between the addresses IPo and IPd) of the first link in the domain C is provided as data for reverse routing in the domain C, and an LP name (ASa.LPa1 or ASa.LPa2 when two LPs are constituted between the addresses IPo and IPd) is provided as data for reverse routing between domains. In a case where LP passing through a plurality of domains is constituted, such data is necessary to properly branch off. Incidentally, in the forward routing, the second label is specified from the first label to extract a link corresponding to the second label. In the reverse routing, the first label is specified from the second label and the virtual label. That is, when applying this inter-domain reverse routing to the reverse routing shown in FIG. 3B, the routing is carried out by a combination of the virtual label L11r and ASa.LPa1 or ASa.LPa2, not by only the virtual label L11r. However, in the example shown in FIG. 14B, basically, the virtual label is not needed at the node ERc, but it is described as an example of a node in the domain C in this embodiment.

Furthermore, FIG. 18 shows an example of data stored in the label map 54 of the node GWRc. The basic structure thereof is the same as that shown in FIG. 17. Because the first label corresponds to a link connected to the domain B, a label composed of a domain name and an LP name in the domain C, such as ASc.LPc1 or ASc.LPc2, is registered as the first label. Incidentally, because relay nodes in the domain are omitted, the first label shown in FIG. 17 does not coincide with the second label shown in FIG. 18.

The LP management server B for managing the domain B receives the constitution information of the domain C from the LP management server C for managing the domain C, in response to the transmission of the constitution information at the step S55 (step S59), and registers data indicating the relationship with the domain C in the LP-DB (step S61). More specifically, it identifies a record from a combination of the source address IPo, the destination address IPd, and the LP name, and registers the total static transmission bandwidth, the label (ASc.LPc) of a link connected to the last node GWRb2 connected in the domain B and the like into the identified record.

Then, the LP management server B in the domain B transmits constitution information of the domain B to the LP management server A for managing the domain A (step S63). The constitution information of the domain B includes a source address IPo and a destination address IPd, and includes a name (for example, ASa.LPa) of LP, the IP address of the node GWRb1, which is the first node connected in the domain C, data of the total static transmission bandwidth (in some cases, data of respective static transmission bandwidths in the domains B and C), and a label (for example, ASb.LPb) of the first link connected to the last node GWRa connected in the domain A for each LP of the top LP group, which is included in the constitution information.

Further, the LP management server B for managing the domain B distributes label data to nodes in its own domain, which are associated with LP included in the top LP group MPLSGsmB, and causes the nodes to store it into the label map 54 (step S65). FIG. 19 shows an example of data stored in the label map 54 of the node GWRb2. The structure of the data is the same as that shown in FIG. 17. However, the virtual label of the domain B includes a label (LPb1 or LPb2) of the first link in the domain B, serving as data for the reverse routing in the domain, and an LP name (ASa.LPa1 or ASa.LPa2), serving as data for the inter-domain reverse routing. Because the node GWRb2 is connected to the node GWRc, the first label shown in FIG. 18 is identical to the second label shown in FIG. 19. Incidentally, the IP address of the node GWRc, which is the first node connected in the domain C, may be needed when the association between the label and the link is carried out in the node GWRb2, and thus it is notified to the node GWRb2. Further, FIG. 20 shows an example of data stored in the label map 54 of the node GWRb1. The basic structure thereof is the same as that shown in FIG. 18. Incidentally, because relay nodes in the domain are omitted, the first label shown in FIG. 19 does not coincide with the second label shown in FIG. 20.

The LP management server A for managing the domain A receives the constitution information of the domain B from the LP management server B for managing the domain B, in response to the transmission of the constitution information at the step S63 (step S67), and registers data indicating the relationship with the domain B in the LP-DB (step S69). More specifically, it identifies a record from a combination of the source address IPo, the destination address IPd and the LP name, and registers the total static transmission bandwidth and the label (ASb.LPb) of a link connected to the last node GWRa connected in the domain A into the identified record.

Further, the LP management server A for managing the domain A distributes label data to nodes in its own domain, which are associated with LP include in the top LP group MPLSGsmA, and causes the nodes to store it into the label map 54 (step S71). FIG. 21 shows an example of data stored in the label map 54 of the node GWRa. In an example of FIG. 21, the virtual label is only the first label (LPa1 or LPb2) of the domain A. This is because it is unnecessary to consider the inter-domain routing, since the domain A is a target domain in the reverse routing. Incidentally, because the node GWRa is connected to the node GWRb1, the first label shown in FIG. 20 is identical to the second label shown in FIG. 21. In addition, the IP address of the node GWRb1, which is the first node connected in the domain B, may be needed when the association between the label and the link is carried out in the node GWRa, and thus it is notified to the node GWRa. Further, FIG. 22 shows an example of data stored in the label map 54 of the node ERa. Because the data can be directly routed to a target source address IPo in the reverse routing, the virtual label is not registered. Incidentally, because relay nodes in the domain are omitted, the first label shown in FIG. 21 does not coincide with the second label shown in FIG. 22.

A preprocessing for carrying out the inter-domain routing is completed by the aforementioned processing. Incidentally, All combinations of the source addresses IPo and the destination addresses IPd have to be processed.

Next, a processing when actual routing is carried out will be described with reference to FIGS. 23 to 28. First, as a preprocessing for routing, an inquiry of an IP address including URL is transmitted from, for example, a web browser of a client terminal to a Domain Name Server (DNS). Then, the node ERa (i.e. an edge router on the client terminal side) receives the inquiry of the IP address including URL from the client terminal, and transfers it to the DNS. Because communication between the node ERa and the DNS frequently occurs, the node ERa holds data for LP and RLP (the first label of LP, the first label of RLP, and a virtual label, if necessary. The data is updated at any time.) designated by the LP management server A in advance, and carries out the transfer of the inquiry by using the data for LP and RLP. When receiving the inquiry of the IP address including URL from the node ERa, the DNS retrieves an IP address corresponding to the URL and replies an IP address notice to the node ERa. When transmitting the IP address notice, the DNS identifies a path by the data of RLP (the first label, and the virtual label, if necessary). The node ERa receives the IP address notice from the DNS, and transfers it to the client terminal, which is a requesting source. Then, the web browser of the client terminal receives the IP address notice from the node ERa.

Figure 23:
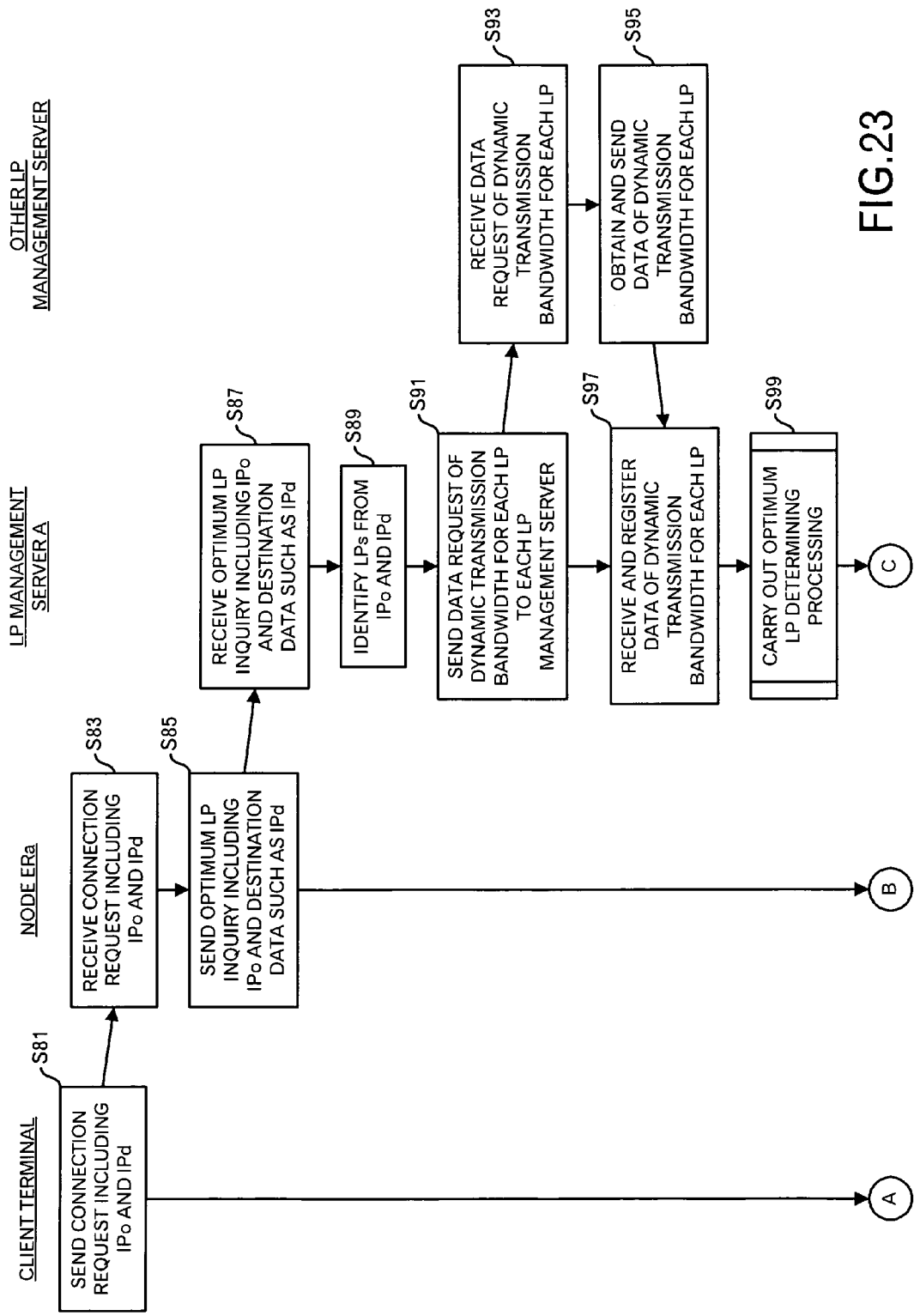
FIG. 23 is a diagram showing a first portion of a flow chart of a processing for carrying out routing based on an optimum LP.

In this way, the preprocessing is completed, and the web browser of the client terminal transmits a request (i.e. connection request) including an IP address thereof (a source address IPo) and the received destination IP address (step S81 in FIG. 23). For example, in case of Hyper Text Transfer Protocol (HTTP), a GET message is transmitted. When receiving the request including the source IP address IPo and the destination IP address IPd from the client terminal, the node ERa stores data of the request in a storage such as a buffer (step S83), and transmits an optimum LP inquiry including the source IP address IPo and destination data such as the destination IP address IPd and a port number, to the LP management server A (step S85). Because communication between the node ERa and the LP management server A frequently occurs, the node ERa previously held data of LP and RLP designated by the LP management server A, and transfers the inquiry by using the data of LP and RLP.

The LP management server A receives the optimum LP inquiry including the source IP address IPo and destination data such as the destination IP address IPd and a port number from the node ERa (step S87), and retrieves data stored in the LP-DB shown in FIG. 16 using the source IP address IPo and the destination IP address IPd to identify LPs (specifically, a record therefore), for which the dynamic transmission bandwidth should calculated (step S89). Because domains associated with each LP are identified at the step S89, it transmits a dynamic transmission bandwidth data request for each LP, including the name of LP, to the LP management server in each identified domain (step S91). Because paths between the LP management servers are frequently used, each LP management server previously holds data of LP and RLP. When receiving the dynamic transmission band width data request for each LP (step S93), the LP management server in the domain associated with each LP reads out, for each LP, uplink and downlink dynamic transmission bandwidth data (for example, BdUb and BdDb) for its own domain from the LP-DB shown in FIG. 16, and replies the read data to the LP management server A (step S95). Incidentally, the uplink and downlink dynamic transmission bandwidth data for it own domain is automatically registered in the LP-DB by the processing shown in FIG. 14A, for example.

The LP management server A receives the dynamic transmission bandwidth data for each LP from the LP management servers in the domains associated with each LP, and registers the received data in the LP-DB shown in FIG. 16 (step S97). For example, it is supposed that LPa1 to LPa4 are identified at the step S89, and that when the dynamic transmission bandwidth data are received from the LP management servers B and C associated with these LPs at the step S97, data shown in FIG. 24 is obtained by combining the received data with the data for the domain A. Incidentally, LPa1 to LPa4 are arranged in descending order of the static transmission bandwidth, that is, LPa1 has the largest static transmission bandwidth, followed by LPa2, LPa3, and LPa4. Because the total dynamic transmission bandwidth of each LP is restricted by the narrowest dynamic transmission bandwidth of paths included in the LP, the total dynamic transmission bandwidth of LPa1 is equal to the dynamic transmission bandwidth of the domain A in both uplink and downlink. The total dynamic transmission bandwidth of LPa2 in uplink is equal to the dynamic transmission band of the domain B in uplink, and the total dynamic transmission bandwidth of LPa2 in downlink is equal to the dynamic transmission band of the domain A in downlink. The total dynamic transmission bandwidth of LPa3 is equal to the dynamic transmission bandwidth of the domain A in both uplink and downlink. The total dynamic transmission bandwidth of LPa4 is equal to the dynamic transmission bandwidth of the domain A in both uplink and downlink.

When those total dynamic transmission bandwidths are registered in the LP-DB, the LP management server A carries out an optimum LP determining processing (step S99). The optimum LP determining processing will be described with reference to FIGS. 25 and 26. The LP management server A determines a routing policy from, for example, the port number included in the destination data of the optimum LP inquiry (step S101). The routing policy is any one of asymmetric routing, symmetric routing in which the traffic amount is almost the same in uplink and downlink, and symmetric routing in which the traffic amount is not the same in uplink and downlink (the traffic amount in uplink or downlink is twice or more in the other, for example). For example, a service in which the routing in uplink is not needed to be symmetric with respect to the routing in downlink is determined as the asymmetric routing. For example, when applications, such as IP phone, file downloading, file uploading, and web browsing, is identified from the IP address and the port number, the symmetric routing is selected. In the case of the IP phone, the symmetric routing in which the traffic amount is almost the same in uplink and downlink is selected. When the file uploading, the file downloading, and the web browsing are identified, the symmetric routing in which the traffic amount is not the same in uplink and downlink is selected.

Therefore, when the asymmetric routing is selected (step S103: No route), the LP management server A selects one LP having the largest dynamic transmission bandwidth in both uplink and downlink referring to the LP-DB (FIG. 16) (step S105). Then, the processing returns to the original routine.

Meanwhile, when the symmetric routing is selected (step S103: Yes route) and the traffic amount is almost the same in uplink and downlink (step S107: Yes route), the LP management server A excludes LP or LPs whose value of the dynamic transmission bandwidth in uplink or downlink in which the traffic amount is smaller, is equal to or smaller than a predetermined value from LPs identified at the step S89 (step S109). In a case where the remaining LPs do not exist, the processing may proceed to step S105. Then, it selects one LP having the smallest difference between the dynamic transmission bandwidths in uplink and downlink from the remaining LPs (step S111). The difference may be changed to the ratio of the dynamic transmission bandwidths in uplink and downlink. Instead of the step S111, it may select one LP having the largest average value of the dynamic transmission bandwidths in uplink and downlink from the remaining LPs. Then, the processing returns to the original routine.

Further, when the symmetric routing is selected (step S103: Yes route) and the traffic amount is not the same in uplink and downlink (step S107: No route), the LP management server A excludes LP or LPs whose value of the dynamic transmission bandwidth in a direction (uplink or downlink) in which the traffic amount is smaller, is equal to or smaller than a predetermined value, from LPs identified at the step S89 (step S113). Incidentally, in a case where the remaining LPs do not exist, the processing may proceed to step S105. Then, the LP management server A selects one LP whose dynamic transmission bandwidth for a direction (uplink or downlink) in which the traffic amount is larger is the broadest from the remaining LPs (step S115). Then, the processing returns to the original routine.

This processing enables the optimum LP to be selected according to the routing policy specified by a communication application or the like.

Figure 25:
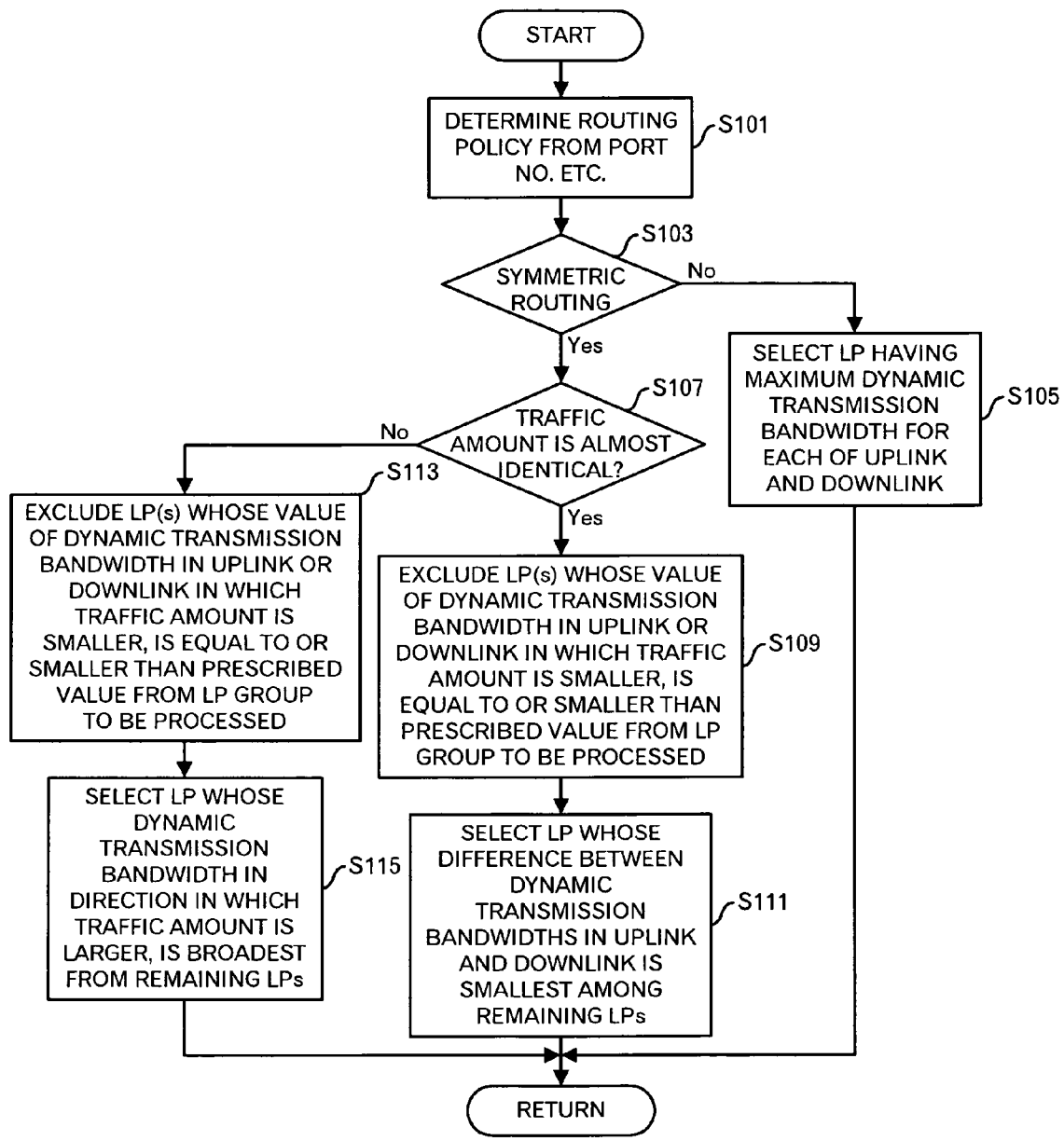
FIG. 25 is a diagram showing a flowchart of an optimum LP determining processing.

The processing shown in FIG. 25 will be described in detail with reference to FIGS. 26A to 26D. As shown in FIG. 26A, a static transmission bandwidth (Bstotal) of LPa1 is 100, an uplink dynamic transmission bandwidth (BdUtotal) thereof is 40, and a downlink dynamic transmission bandwidth (BdDtotal) thereof is 3. In addition, a static transmission bandwidth (Bstotal) of LPa2 is 80, an uplink dynamic transmission bandwidth (BdUtotal) thereof is 30, and a downlink dynamic transmission bandwidth (BdDtotal) thereof is 10. Further, a static transmission bandwidth (Bstotal) of LPa3 is 50, an uplink dynamic transmission bandwidth (BdUtotal) thereof is 20, and a downlink dynamic transmission bandwidth (BdDtotal) thereof is 30. As shown in FIG. 26B, when the asymmetric routing is selected, LPa1 has the largest dynamic transmission bandwidth in uplink, and LPa3 has the largest dynamic transmission bandwidth in downlink. Therefore, LPa1 and LPa3 are respectively selected in uplink and downlink. Meanwhile, as shown in FIG. 26C, when the symmetric routing in which the traffic amount is not the same in uplink and downlink is selected, specifically, when the traffic amount in uplink is larger than that in downlink, LPa1 whose dynamic transmission bandwidth in downlink is narrower than a predetermined bandwidth is removed at the step S113, and LPa2 whose dynamic transmission bandwidth in uplink is the broadest is selected at the step S115. In addition, as shown in FIG. 26D, when the symmetric routing in which the traffic amount is almost the same in uplink and downlink is selected, LPa1 having the smallest dynamic transmission bandwidth in downlink is removed at the step S109, and LPa3 is selected at the step Sill as LP having the smallest difference between the dynamic transmission bandwidths in uplink and downlink.

Figure 27:
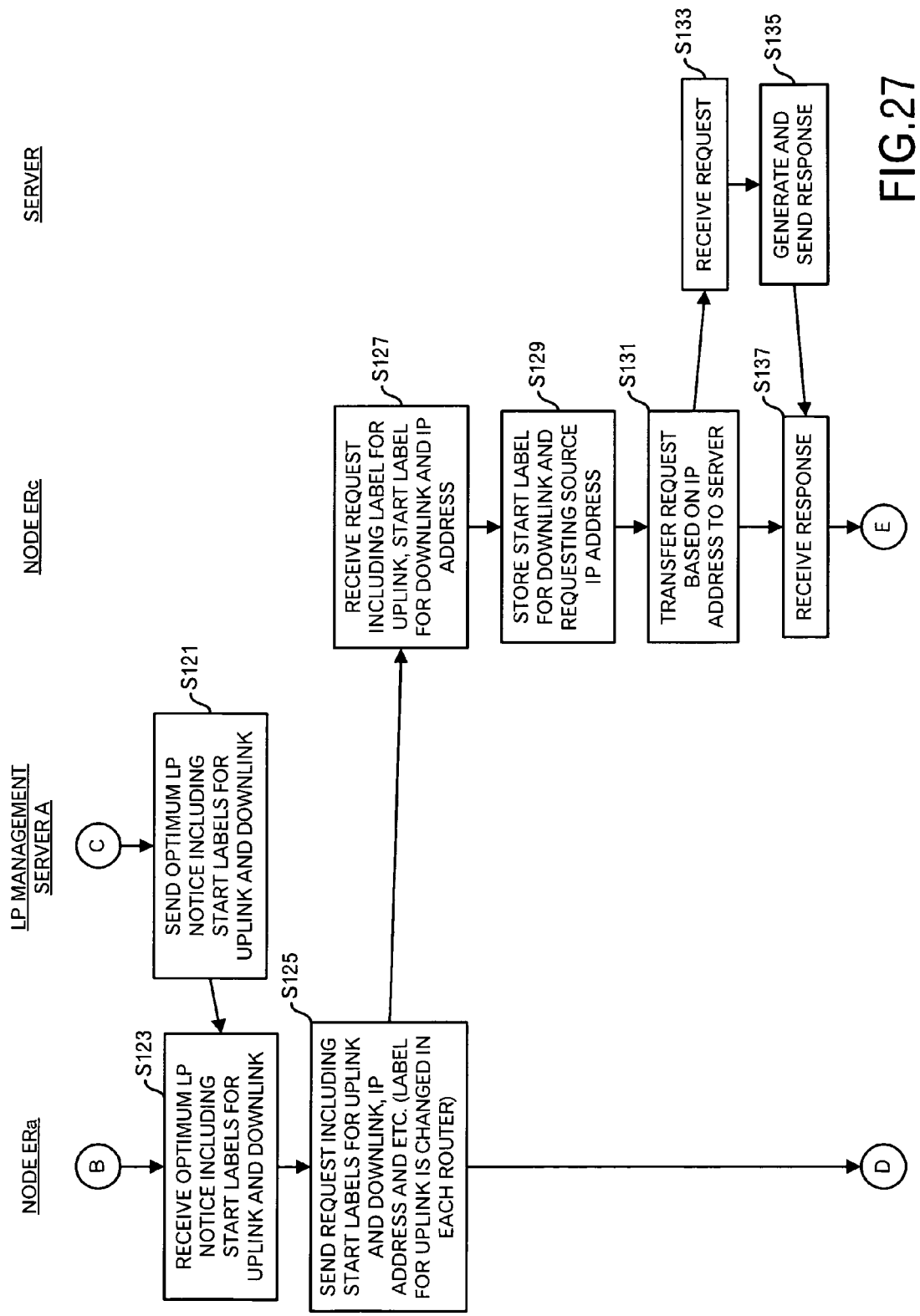
FIG. 27 is a diagram showing a second portion of a flow chart of the process for carrying out routing based on the optimum LP.

When returning to the explanation of FIG. 23, the processing shown in FIG. 23 proceeds to that shown in FIG. 27 through the terminals B and C. Incidentally, the processing of the client terminal proceeds to that shown in FIG. 28 through the terminal A. First, in FIG. 27, the LP management server A transmits, to the node ERa, an optimum LP notice including uplink and downlink start labels (when a virtual label is required for the LP in downlink, the virtual label is also included. This is applied to the following explanation.) specified by the LP-DB (FIG. 16) and LP determined at the step S99 (step S121). The node ERa receives the optimum LP notice including the uplink and downlink start labels from the LP management server A (step S123), modifies the request received at the step S83 so as to include the uplink and downlink start labels, and transmits, to a destination server, the request including the uplink and downlink start labels and the IP address of the destination server (step S125). Incidentally, the node ERa identifies a destination link by referring to the link table with the uplink start label. The next router identifies the next label by referring to the label table with the uplink start label, and then identifies the destination link by referring to the link table with the next label. Then, the next router replaces the start label in the received request with the next label, and transmits the request to the further next router. Because the processing for constituting LP has already been performed as described above, data is routed to the node ERc (edge router on the server side) in the domain C by repeatedly carrying out the aforementioned processing.

The node ERc receives a request including an uplink label, the downlink start label, and the IP address of the destination server from a preceding router (step S127), and stores the downlink start label and the IP address of a requesting source into a storage, such as a main memory (step S129). Then, the node ERc identifies the destination of the request by the IP address of the destination server, and transfers the request to the destination server (step S131).

The destination server receives the request from the node ERc (step S133), carries out a predetermined processing to generate a response, and transmits the response (step S135). The node ERc receives the response from the destination server (step S137). Then, the processing proceeds to that shown in FIG. 28 through terminals D and E.

The node ERc identifies the downlink start label stored at the step S129 to generate a response including the start label and the IP address of a requesting source in addition to data of the received response, and transmits the response according to the downlink start label (step S139). The node ERc identifies a destination link by referring to the link table with the downlink start label. The next router identifies the next label by referring to the label table with the downlink start label, and then identifies the destination link by referring to the link table with the next label. Then, the node ERc replaces the uplink start label of the received response with the next label, and transmits the response to the further next router. Because the processing for constituting LP has already been carried out also in downlink, similar to uplink, data is routed to the node ERa by repeatedly carrying out the aforementioned processing. The node ERa receives the response including the downlink label and the IP address of the requesting source (step S141), and transfers the response to the client terminal according to the IP address of the requesting source (step S143). The client terminal receives the response from the edge router on the client terminal side, and displays the response on a display device using, for example, a web browser (step S145).

By carrying out such processings, the communication between the client terminal and the destination server is carried out according to the optimum LP determined by the LP management server A. Therefore, it is possible to effectively carry out communication in the entire network including a plurality of domains. In addition, the communication of necessary data between domains is suppressed to the minimum.

Although an embodiment of the invention has been described above, the invention is hot limited to this. For example, in the aforementioned embodiment, indexes are specified in the processing for specifying the optimum server and LP. However, another calculation expression may be defined, and index values calculated by the calculation expression may be used as the reference for determination.

Further, the aforementioned routing policies are mere examples, and other routing policies may be defined. In this case, it is necessary to specify LP and the optimum server according to the defined routing policy.

Furthermore, the LP management servers A to D may be constituted such that they are processed in parallel by plural computers.

Moreover, in the aforementioned embodiment, labels are managed within each domain, and the same label exists in different domains. However, labels may be assigned such that the same label does not exist in all domains. In this case, when one LP is determined, labels included therein are uniquely determined. Therefore, the virtual label is not needed in the routers.

As for the virtual label, a virtual label unique in a source domain, which corresponds to "source network address. path multiplicity priority order" may be used as a virtual label within the source domain, and a virtual label in which the source domain name (AS) is attached to the virtual label within the domain may be used as a virtual label for the inter-domain and domains other than the source domain. In this case, the virtual label only includes one element, unlike in the aforementioned embodiment. The term "path multiplicity priority order" means a ranking assigned to the LP defined between specific nodes (end to end). For example, the "path multiplicity priority order" is a value (1, 2, or 3) entered in the column of LP# shown in FIG. 9.

In a method in which a head link name is used as an LP name unique to a domain, the number of labels increases according to (the square of the number of connection edge routers), and thus the number of connection edge routers reaches an upper limit soon. In a case of the current label capacity of 20 bits, the number of labels is limited to 1000× 1000, and even when path multiplicity is 1, it is impossible to connect 1000 points or more. When the source address×path multiplicity is used as the virtual label, it is possible to considerably reduce the number of labels, compared with the case in which the head label name of each LP is used, and thus the current 20 bits×four multiplicity paths makes it possible to connect two hundred fifty thousands of points in a mesh.

As for the virtual label, as the virtual labels within the domain and between domains, a "source prefix. path multiplicity priority order" can be commonly used. In this case, the virtual label includes only one element, and the assignment of the AS number is not needed. The term "source prefix" means a source network address including the notation of the length of a source-side network address in an IP address.

Similarly, when a "source prefix. path multiplicity" is used as the virtual label, it is possible to considerably reduce the number of labels, compared with the case in which the head label name of each LP is used, and thus the current 24 bits (a class C+four multiplicity paths) makes it possible to connect sixteen millions of points in a mesh. In addition, it is possible to use the virtual label between domains without labeling the domain number (AS). The term 'prefix' means network address information including a network size.

Figure 28:
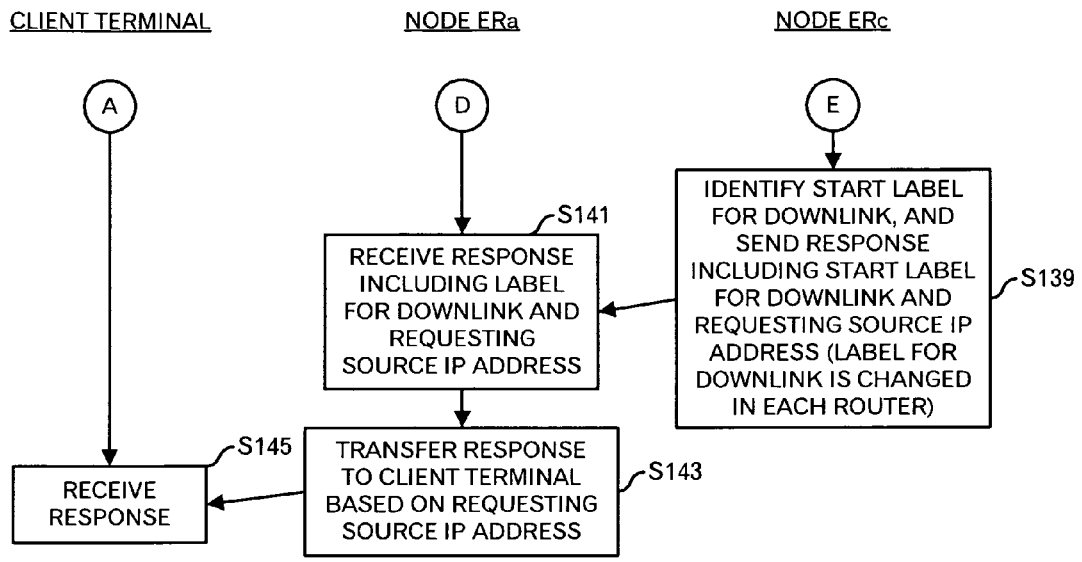
FIG. 28 is a diagram showing a third portion of a flow chart of the process for performing routing based on the optimum LP.
Figure 29:
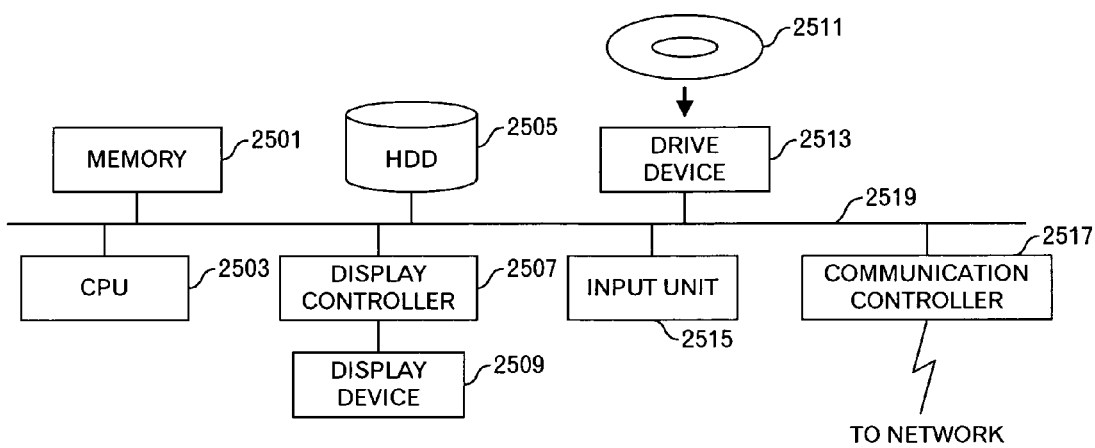
FIG. 29 is a functional block diagram of a computer system.

In addition, the LP management servers A to C are computer devices as shown in FIG. 29. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the afore mentioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method executed by a management server that manages paths between arbitrary nodes in a specific domain, comprising:
   detecting an event in which a path is constituted between a source address associated with said specific domain and a destination address associated with a second domain different from said specific domain;
   constituting a plurality of paths between a first node associated with said source address and a second node associated with said second domain and included in said specific domain;
   identifying, as registered paths, a number of paths based on bandwidth information of said plurality of paths;
   storing said source address, said destination address and data concerning said registered path for each said registered path into a path data storage;
   transmitting, to a management server in a third domain connected to said second node, a constitution request including said source address and said destination address, and including, for each said registered path, data concerning bandwidth of said registered path and data concerning said second node;
   receiving constitution information including said source address and said destination address, and including, for each said registered path, data concerning a connection link between said second node and a connection node on the third domain side from said management server in said third domain;
   storing said data concerning said connection link into said path data storage, in association with a combination of said source address, said destination address, and said data concerning said registered path; and
   carrying out setting for routing to nodes associated with said registered path in said specific domain by using data stored in said path data storage.

2. The information processing method as set forth in claim 1, further comprising:
   receiving a second constitution request including a source address and a destination address, which are associated with a domain different from said specific domain, and including, for each candidate path, data concerning bandwidth of said candidate path and data concerning a last relay node in a fourth domain from a management server of said fourth domain;
   constituting a plurality of paths between said last relay node and a third node associated with a fifth domain, which is associated with said destination address included in said second constitution request, in said specific domain;
   identifying, as second registered paths in said specific domain, a second number of paths whose total bandwidth in which said bandwidth of said candidate path is taken into account is ranked within the top among said plurality of paths;
   storing said source address and said destination address, which are included in said second constitution request, and data concerning said second registered path in said specific domain into said path data storage;
   transmitting a third constitution request including said source address and said destination address, which are included in the received second constitution request, and including, for each said identified second registered path, data concerning said total bandwidth of said second registered path and data concerning said third node, to a management server of a sixth domain connected with said third node;
   receiving, from said management server of said sixth domain, second constitution information including said source address and said destination address, which are included in the received second constitution request, and including, for each said second registered path in the transmitted third constitution request, data concerning a connection link between said third node and a connection node of the sixth domain side;

storing said data concerning said connection link, which is included in the received second constitution information, into said path data storage in association with a combination of said source address and said destination address, which are included in said second constitution information, and said second registered path;

carrying out setting for routing to said nodes within said specific domain, which are associated with said second registered path, by using data stored in said path data storage; and transmitting, to said management server in said fourth domain, third constitution information including said source address and said destination address, which are included in said second constitution information, and including, for each said second registered path, data concerning a connection link between said last relay node in said fourth domain and a connection node in said specific domain.

3. The information processing method as set forth in claim 1, further comprising:

receiving a fourth constitution request including a destination address associated with said specific domain and a source address associated with a eighth domain other than said specific domain, and including, for each candidate path, data concerning bandwidth of said candidate path and data of a last relay node in a seventh domain, from a management server in said seventh domain;

constituting a plurality of paths between said last relay node and a node associated with said destination address, which is included in said fourth constitution request, in said specific domain;

identifying, as third registered paths in said specific domain, a third number of paths whose total bandwidth in which said bandwidth of said candidate path is taken into account is ranked within the top among said plurality of paths;

storing said source address and said destination address, which are included in said fourth constitution request, and data concerning said third registered path in said specific domain into said path data storage;

carrying out setting for routing to said nodes within said specific domain, which are associated with said third registered path, by using data stored in said path data storage; and transmitting, to said management server in said seventh domain, fourth constitution information including said source address and said destination address, which are included in said fourth constitution request, and including, for each said third registered path, data concerning a connection link between said last relay node in said seventh domain and a connection node in said specific domain.

4. The information processing method as set forth in claim 1, wherein a label unique in each domain is assigned to a head link included in a path, a link of a portion connected with another domain is identified by identification information of a domain to which said link belongs and a label in said domain, and said data concerning said registered path includes labels of links included in said registered path.

5. The information processing method as set forth in claim 1, wherein a label unique in a plurality of domains is assigned to a head link included in a path, and said data concerning said registered path includes labels of links included in said registered path.

6. The information processing method as set forth in claim 1, wherein a label in a belonging domain is assigned to each link included in a path, a link of a portion connected with another domain is identified by identification information of a domain to which said link belongs and a label in said domain, an identical label is assigned to a shared link shared by a plurality of paths, said path data storage stores labels of respective links included in said specific domain and in said registered path in association with data to identify a link branch direction in a reverse direction of said registered path, for said shared link included in said respective links, which are included in said specific domain and in said registered path, and said carrying out includes registering, as routing data, data to identify, from a specific label, a next link in said registered path including a link corresponding said specific label, and data including, for said shared link in said registered path, data to identify a branch direction at a reverse direction routing in said specific domain, which is other than a domain associated with a source address of said registered path, and data to identify whole of said registered path.

7. The information processing method as set forth in claim 1, wherein the identifying identifies, as registered paths, the number of paths whose bandwidth is ranked within the top among said plurality of paths.

8. The information processing method as set forth in claim 1, wherein said third domain is an adjacent domain of said specific domain.

9. An information processing method executed by a management server in a source side domain of inter-domain communication, comprising:

receiving a path setting request including data concerning a source of a packet and data concerning a destination of said packet;

referring to a path data storage storing data of a candidate path in association with a source address and a destination address, to identify candidate paths relating to said path setting request;

identifying a routing policy of said packet based on said data concerning said destination of said path setting request;

requesting a management server of another associated domain on the identified candidate path to transmit data concerning a dynamic transmission bandwidth of said identified candidate path in said another associated domain;

receiving said data concerning said dynamic transmission bandwidth of said identified candidate path in said another associated domain from said management server of said another associated domain on said identified candidate path;

calculating total dynamic transmission bandwidth of the entire identified candidate path based on data concerning dynamic transmission bandwidth of said identified candidate path in said source domain and the received data concerning said dynamic transmission bandwidth of said identified candidate path in said another associated domain, and storing data of the calculated total dynamic transmission bandwidth into a storage;

determining an optimum path from the identified candidate paths based on said routing policy and said calculated total dynamic transmission bandwidths of said entire candidate paths, which are stored in the storage; and transmitting data to identify said optimum path to a requesting source of said path setting request.

10. The information processing method as set forth in claim 9, wherein said determining includes determining, for said identified routing policy that is an asymmetric routing in uplink and downlink, a path whose value of said dynamic transmission bandwidth in uplink is largest and a path whose value of said dynamic transmission bandwidth in downlink is largest from said identified candidate paths.

11. The information processing method as set forth in claim 9, wherein said determining includes determining, for said routing policy that is a symmetric routing in which it is presumed that difference between traffic amounts in uplink and in downlink or ratio thereof is within a range, a path whose values of said dynamic transmission bandwidths in uplink and in downlink satisfy a condition from said identified candidate paths.

12. The information processing method as set forth in claim 9, wherein said determining comprises determining, for said routing policy that is a symmetric routing in which it is presumed that difference between traffic amounts in uplink and in downlink or ratio thereof is out of a range, a path whose value of said dynamic transmission bandwidth in a direction whose traffic amount is presumed to be larger is the largest from said identified candidate paths.

13. A computer-readable storage medium storing executable instructions that, when executed by a management server that manages paths between arbitrary nodes in a specific domain, cause the management server to perform a method comprising:
   detecting an event in which a path is constituted between a source address associated with said specific domain and a destination address associated with a second domain different from said specific domain;
   constituting a plurality of paths between a first node associated with said source address and a second node associated with said second domain and included in said specific domain;
   identifying, as registered paths, a number of paths whose bandwidth is ranked within the top among said plurality of paths;
   storing said source address, said destination address and data concerning said registered path for each said registered path into a path data storage;
   transmitting, to a management server in a third domain connected to said second node, a constitution request including said source address and said destination address, and including, for each said registered path, data concerning bandwidth of said registered path and data concerning said second node, wherein said third domain is an adjacent domain of said specific domain;
   receiving constitution information including said source address and said destination address, and including, for each said registered path, data concerning a connection link between said second node and a connection node on the third domain side from said management server in said third domain;
   storing said data concerning said connection link into said path data storage, in association with a combination of said source address, said destination address, and said registered path; and
   carrying out setting for routing to nodes associated with said registered path in said specific domain by using data stored in said path data storage.

14. A computer-readable storage medium storing executable instructions that, when executed by a management server in a source side domain of inter-domain communication, cause the management server to perform a method comprising:
   receiving a path setting request including data concerning a source of a packet and data concerning a destination of said packet;
   referring to a path data storage storing data of a candidate path in association with a source address and a destination address, to identify candidate paths relating to said path setting request;
   identifying a routing policy of said packet based on said data concerning said destination of said path setting request;
   requesting a management server of another associated domain on the identified candidate path to transmit data concerning a dynamic transmission bandwidth of said identified candidate path in said another associated domain;
   receiving said data concerning said dynamic transmission bandwidth of said identified candidate path in said another associated domain from said management server of said another associated domain on said identified candidate path;
   calculating total dynamic transmission bandwidth of the entire identified candidate path based on data concerning dynamic transmission bandwidth of said identified candidate path in said source domain and the received data concerning said dynamic transmission bandwidth of said identified candidate path in said another associated domain, and storing data of the calculated total dynamic transmission bandwidth into a storage;
   determining an optimum path from the identified candidate paths based on said routing policy and said calculated total dynamic transmission bandwidths of said entire candidate paths, which are stored in the storage; and
   transmitting data to identify said optimum path to a requesting source of said path setting request.

15. A management server for managing paths between arbitrary nodes in a specific domain, comprising:
   a unit that detects an event in which a path is constituted between a source address associated with said specific domain and a destination address associated with a second domain different from said specific domain;
   a unit that constitutes a plurality of paths between a first node associated with said source address and a second node associated with said second domain and included in said specific domain, identifies, as registered paths, a number of paths whose bandwidth is ranked within the top among said plurality of paths, and stores said source address, said destination address and data concerning said registered path for each said registered path into a path data storage;
   a unit that transmits, to a management server in a third domain connected to said second node, a constitution request including said source address and said destination address, and including, for each said registered path, data concerning bandwidth of said registered path and data concerning said second node, wherein said third domain is an adjacent domain of said specific domain;
   a unit that receives constitution information including said source address and said destination address, and including, for each said registered path, data concerning a connection link between said second node and a connection node on the third domain side from said management server in said third domain, and stores said data concerning said connection link into said path data storage, in association with a combination of said source address, said destination address, and said registered path; and a unit that carries out setting for routing to nodes associated with said registered path in said specific domain by using data stored in said path data storage.

16. A management server in a source side domain of inter-domain communication, comprising:

a unit that receives a path setting request including data concerning a source of a packet and data concerning a destination of said packet;

a unit that refers to a path data storage storing data of a candidate path in association with a source address and a destination address, to identify candidate paths relating to said path setting request;

a unit that identifies a routing policy of said packet based on said data concerning said destination of said path setting request;

a unit that requests a management server of another associated domain on the identified candidate path to transmit data concerning a dynamic transmission bandwidth of said identified candidate path in said another associated domain;

a unit that receives said data concerning said dynamic transmission bandwidth of said identified candidate path in said another associated domain from said management server of said another associated domain on said identified candidate path;

a unit that calculates total dynamic transmission bandwidth of the entire identified candidate path based on data concerning dynamic transmission bandwidth of said identified candidate path in said source domain and the received data concerning said dynamic transmission bandwidth of said identified candidate path in said another associated domain, and stores data of the calculated total dynamic transmission bandwidth into a storage;

a unit that determines an optimum path from the identified candidate paths based on said routing policy and said calculated total dynamic transmission bandwidths of said entire candidate paths, which are stored in the storage; and a unit that transmits data to identify said optimum path to a requesting source of said path setting request.

17. A router for carrying out routing according to an instruction from a management server for managing paths between arbitrary nodes in a specific domain, comprising:

a data storage to store a pair of labels assigned to an input link and an output link that are directly connected to said router among links included in paths passing through said router, and relationships between labels and links; and a routing unit that refers to said data storage to identify a link and an output label corresponding to an input label included in a received packet and carries out routing on said received packet, and wherein an identical label is assigned to a shared link shared with a plurality of paths, said data storage further stores data to identify a branch direction at a reverse routing and data to identify the entire path in association with said pair of labels, and said routing unit refers to said data storage to identify a link and an output label corresponding to a combination of an input label, data to identify a branch direction at a reverse routing and data to identify the entire path, which are included in a received second packet being backwardly routed between domains and carries out routing on said received second packet.

* * * * *